United States Patent
Yabuno et al.

(10) Patent No.: US 10,744,467 B2
(45) Date of Patent: Aug. 18, 2020

(54) HOLLOW FIBER MEMBRANE, AND METHOD FOR PRODUCING HOLLOW FIBER MEMBRANE

(71) Applicant: KURARAY CO., LTD., Kurashiki-shi (JP)

(72) Inventors: Youhei Yabuno, Okayama (JP); Tsukasa Yoshitoshi, Okayama (JP); Yusuke Hayashi, Okayama (JP)

(73) Assignee: KURARAY CO., LTD., Kurashiki-shi (JP)

( * ) Notice: Subject to any disclaimer, the term of this patent is extended or adjusted under 35 U.S.C. 154(b) by 329 days.

(21) Appl. No.: 15/128,385

(22) PCT Filed: Feb. 26, 2015

(86) PCT No.: PCT/JP2015/055686
§ 371 (c)(1),
(2) Date: Sep. 22, 2016

(87) PCT Pub. No.: WO2015/146469
PCT Pub. Date: Oct. 1, 2015

(65) Prior Publication Data
US 2018/0169590 A1  Jun. 21, 2018

(30) Foreign Application Priority Data
Mar. 26, 2014 (JP) .................... 2014-063791

(51) Int. Cl.
*B01D 69/08* (2006.01)
*B01D 71/34* (2006.01)
(Continued)

(52) U.S. Cl.
CPC ......... *B01D 69/08* (2013.01); *B01D 67/0006* (2013.01); *B01D 67/0011* (2013.01);
(Continued)

(58) Field of Classification Search
CPC ............ B01D 2323/02; B01D 2323/06; B01D 2323/12; B01D 2323/20; B01D 2323/22;
(Continued)

(56) References Cited

U.S. PATENT DOCUMENTS 5,629,084 A   5/1997 Moya
5,834,107 A * 11/1998 Wang .................. B01D 39/083
                                                  428/310.5
(Continued)

FOREIGN PATENT DOCUMENTS

CN     1213339 A     4/1999
JP     9-512857 A    12/1997
(Continued)

OTHER PUBLICATIONS

International Search Report dated Apr. 14, 2015 in PCT/JP2015/055686, filed Feb. 26, 2015.
(Continued)

*Primary Examiner* — Latosha Hines
(74) *Attorney, Agent, or Firm* — Oblon, McClelland, Maier & Neustadt, L.L.P.

(57) ABSTRACT

One aspect of the present invention concerns a porous hollow fiber membrane containing a vinylidene fluoride-based resin. The hollow fiber membrane has a gradient structure in which a pore diameter of pores in the hollow fiber membrane gradually becomes smaller at least toward one of inner and outer peripheral surface sides and is hydrophilized by containing a crosslinked body of a polyvinylpyrrolidone-based resin.

7 Claims, 7 Drawing Sheets

(51) Int. Cl.
  *B01D 69/02* (2006.01)
  *B01D 67/00* (2006.01)
  *B01D 71/32* (2006.01)
  *D01F 1/08* (2006.01)
  *B01D 71/44* (2006.01)
  *B01D 63/02* (2006.01)

(52) U.S. Cl.
  CPC ..... *B01D 67/0016* (2013.01); *B01D 67/0093* (2013.01); *B01D 69/02* (2013.01); *B01D 71/32* (2013.01); *B01D 71/34* (2013.01); *D01F 1/08* (2013.01); *B01D 63/02* (2013.01); *B01D 71/44* (2013.01); *B01D 2323/02* (2013.01); *B01D 2323/06* (2013.01); *B01D 2323/12* (2013.01); *B01D 2323/30* (2013.01); *B01D 2325/022* (2013.01); *B01D 2325/20* (2013.01); *B01D 2325/24* (2013.01); *B01D 2325/36* (2013.01)

(58) Field of Classification Search
  CPC .......... B01D 2323/30; B01D 2325/022; B01D 2325/20; B01D 2325/24; B01D 2325/36; B01D 63/02; B01D 67/0006; B01D 67/0011; B01D 67/0016; B01D 67/0093; B01D 69/02; B01D 69/08; B01D 69/141; B01D 71/32; B01D 71/34; B01D 71/44; B01D 71/62; D01F 1/08
  See application file for complete search history.

(56) References Cited

U.S. PATENT DOCUMENTS

| | | |
|---|---|---|
| 6,110,309 A | 8/2000 | Wang et al. |
| 6,146,747 A | 11/2000 | Wang et al. |
| 2008/0203018 A1 | 8/2008 | Muller et al. |
| 2008/0214687 A1* | 9/2008 | Muller ............... B01D 67/0006 521/54 |
| 2009/0148659 A1* | 6/2009 | Ishiodori ............... B01D 69/02 428/131 |
| 2009/0230053 A1* | 9/2009 | Mullette ............... B01D 61/145 210/500.23 |
| 2010/0041779 A1 | 2/2010 | Lee et al. |
| 2012/0132583 A1 | 5/2012 | Son et al. |

FOREIGN PATENT DOCUMENTS

| | | | |
|---|---|---|---|
| JP | 2006-239680 A | 9/2006 | |
| JP | 2007245107 A * | 9/2007 | |
| JP | 2008-62226 A | 3/2008 | |
| JP | 2005-543546 | 12/2008 | |
| JP | 2009-39716 A | 2/2009 | |
| JP | 2012-525966 A | 10/2012 | |
| JP | 2013-94692 A | 5/2013 | |
| JP | 2013-202461 A | 10/2013 | |
| JP | 5371867 B2 * | 12/2013 | ........... B01D 69/084 |
| WO | WO 2008/072906 A1 | 6/2008 | |

OTHER PUBLICATIONS

Office Action dated Nov. 24, 2016 in Australian Patent Application No. 2015235572.

Combined Chinese Office Action and Search Report dated Mar. 5, 2018 in Chinese Patent Application No. 201580016494.5 (with English Translation of Category of Cited Documents), citing document AO therein, 7 pages.

* cited by examiner

HOLLOW FIBER MEMBRANE, AND METHOD FOR PRODUCING HOLLOW FIBER MEMBRANE

TECHNICAL FIELD

The present invention relates to a hollow fiber membrane and a method for producing a hollow fiber membrane.

BACKGROUND ART

Since a separation technology using a hollow fiber membrane has advantages such as the miniaturization of a device, it is widely used in various fields such as water treatment fields such as water purification, drinking water production, industrial water production and waste water treatment, food industry fields, and pharmaceutical product production fields.

Further improvements in permeation performance, fractionation characteristic, etc. are required for hollow fiber membranes used in such a separation technology. Specifically, if the permeation performance of a hollow fiber membrane is enhanced, a necessary membrane area becomes smaller and a device for realizing the separation technology using the hollow fiber membrane can be further miniaturized. This is advantageous in terms of cost since facility cost and membrane exchange cost can be reduced. Further, the hollow fiber membrane has advantages such as the widening of targets to be removed if the fractionation characteristic thereof can be enhanced.

However, a separation membrane such as a hollow fiber membrane is generally such that fractionation characteristic is reduced if permeation performance is enhanced and permeation performance is reduced if fractionation characteristic is enhanced, i.e. permeation performance and fractionation characteristic tend to be in a so-called trade-off relationship. Thus, it is difficult to improve both permeation performance and fractionation characteristic of the hollow fiber membrane.

On the other hand, a separation membrane using a fluorine-based material such as a vinylidene fluoride-based resin has attracted attention due to high chemical durability, high physical durability and the like. Examples of the separation membrane using such a fluorine-based material include hollow fiber membranes described in patent literature 1 to 3.

Patent literature 1 describes a fluorine-based hollow fiber membrane including a filter area of a sponge structure having pores of an average diameter of 0.01 μm to 0.5 μm, a support area of a sponge structure having pores of an average diameter of 0.5 μm to 5 μm and a backwash area of a sponge structure having pores of an average diameter of 2 μm to 10 μm, wherein the filter area, the support area and the backwash area are successively formed from an outer surface toward an inner surface.

According to patent literature 1, it is disclosed that excellent backwash performance and filter performance can be exhibited while outstanding mechanical strength is possessed.

Further, patent literature 2 describes a porous membrane production method for producing a porous membrane by a nonsolvent induced phase separation method by discharging a membrane forming solution containing at least a polyvinylidene fluoride resin and a solvent and bring the membrane forming solution into contact with a coagulation liquid containing at least a nonsolvent. It is described in patent literature 2 that, in this production method, a discharge temperature of the membrane forming solution is not lower than a melting point of the polyvinylidene fluoride resin and below a decomposition temperature of the polyvinylidene fluoride resin and a temperature of the coagulation liquid is higher than a porous structure formation start temperature of the membrane forming solution.

According to patent literature 2, it is disclosed that a porous membrane having not only excellent water permeability, excellent performance in blocking micropathogens and high chemical resistance, but also capable of stably and sufficiently removing micropathogens for a long period of time can be produced.

Further, patent literature 3 describes a fluororesin-based polymer separation membrane having a three-dimensional network structure and a spherical structure, the three-dimensional network structure containing at least one kind of a hydrophilic polymer selected from cellulose ester, aliphatic vinyl ester, vinylpyrrolidone, ethylene oxide and propylene oxide.

According to patent literature 3, it is disclosed that various performances such as separation performance, water permeation performance, chemical strength (chemical resistance), physical strength and stain resistance can be enhanced.

CITATION LIST

Patent Literature

Patent literature 1: Japanese Unexamined Patent Publication No. 2012-525966
Patent literature 2: Japanese Unexamined Patent Publication No. 2013-202461
Patent literature 3: Japanese Unexamined Patent Publication No. 2006-239680

SUMMARY OF INVENTION

The present invention aims to provide a hollow fiber membrane excellent in both permeation performance and fractionation characteristic and also in strength.

A hollow fiber membrane according to one aspect of the present invention is a porous hollow fiber membrane containing a vinylidene fluoride-based resin, characterized by having a gradient structure in which a pore diameter of pores in the hollow fiber membrane gradually becomes smaller at least toward one of inner and outer peripheral surface sides and being hydrophilized by containing a crosslinked body of a polyvinylpyrrolidone-based resin.

The above and other objects, features and advantages of the present invention will become apparent from the following detailed description.

DESCRIPTION OF EMBODIMENT

Figure 1:
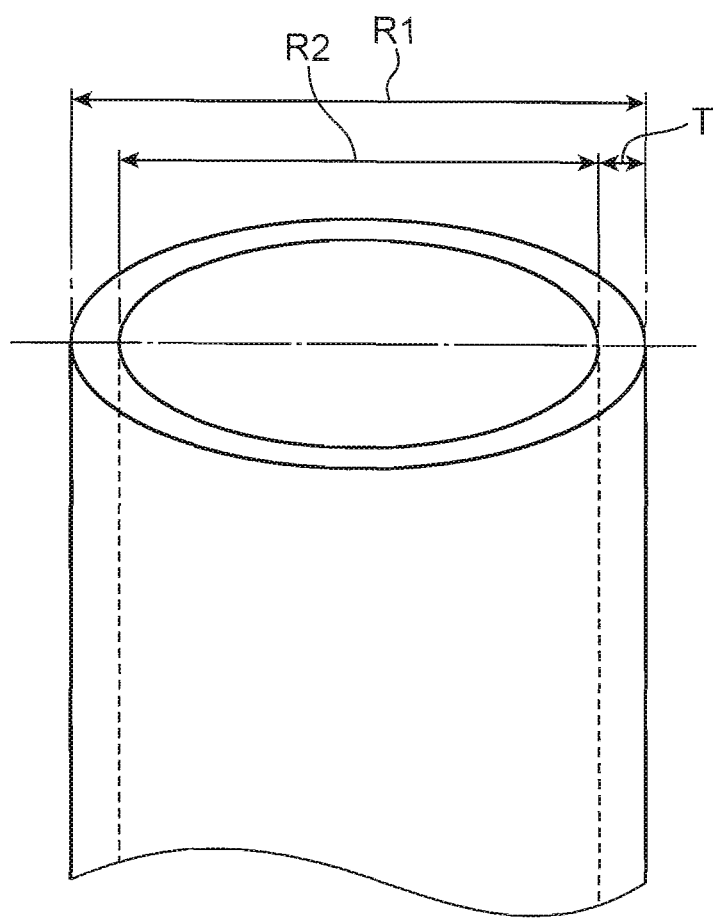
FIG. 1 is a partial perspective view of a hollow fiber membrane according to an embodiment of the present invention.

According to the study of the present inventors, permeation performance is not sufficiently high as compared to fractionation characteristic and a further improvement of permeation performance is thought to be necessary in the hollow fiber membrane described in patent literature 1 and the porous membrane described in patent literature 2.

Further, according to the study of the present inventors, the peeling-off of the three-dimensional network structure layer and the spherical structure layer, thickness unevenness of the three-dimensional network structure layer and the like could not be sufficiently suppressed in some cases with the separation membrane described in patent literature 3. Further, the separation membrane described in patent literature 3 had a large thickness unevenness of the three-dimensional network structure layer and micropores were formed in the three-dimensional network structure layer in some cases. The following is, for example, thought to cause these. As a method for producing this polymer separation membrane, a method for applying the fluororesin-based polymer solution containing the hydrophilic polymer to the surface of the spherical structure layer to coat the spherical structure layer with the three-dimensional network structure layer is described in patent literature 3. In such a production method, it is thought that the polymer solution for forming the three-dimensional network structure layer cannot be evenly applied when being applied to the surface of the spherical structure layer. This is thought to notably occur if it is attempted to thin the three-dimensional network structure layer. From these, micropores are thought to be formed in the three-dimensional network structure layer in some cases. Further, such a production method is disadvantageous also in terms of production cost since the three-dimensional network structure layer and the spherical structure layer need to be separately formed.

The present invention was developed in view of such a situation and aims to provide a hollow fiber membrane excellent in permeation performance and fractionation characteristic and also in strength and a production method therefor.

Further, porous hollow fiber membranes are known as hollow fiber membranes excellent in permeation performance and fractionation characteristic. Further, a method utilizing phase separation is known as a method for producing such a porous hollow fiber membrane. Examples of this method for producing a hollow fiber membrane utilizing phase separation include a nonsolvent induced phase separation (NIPS) method and a thermally induced phase separation (TIPS) method.

The NIPS method is a method for inducing a phase separation phenomenon by the substitution of a solvent and a nonsolvent of a polymer solution using a concentration difference of the polymer solution and the nonsolvent as a drive force by bringing the uniform polymer solution in which a polymer is dissolved in the solvent and the nonsolvent in which a polymer is not dissolved into contact. In the NIPS method, a pore diameter of fine pores formed changes depending on a solvent exchange rate. Specifically, as the solvent exchange rate decreases, the fine pours tend to become coarser. Further, in the production of the hollow fiber membrane, the solvent exchange rate is fastest at a contact surface with the nonsolvent and becomes slower toward the inside of the membrane. Thus, the hollow fiber membrane produced by the NIPS method has an asymmetric structure dense near the contact surface with the nonsolvent and gradually having coarser fine pores toward the inside of the membrane. However, in a part distant from the contact surface, the solvent exchange rate becomes too slow and coarse pores called microvoids are formed and strength and chemical resistance tend to be reduced.

On the other hand, the TIPS method is a method for inducing a phase separation phenomenon by dissolving a polymer in a poor solvent, which is dissolvable under high temperature, but non-dissolvable if temperature decreases, under high temperature and cooling a resulting solution. Since a heat exchange rate is generally faster than the solvent exchange rate in the NIPS method and difficult to control, uniform fine pores tend to be formed in a membrane thickness direction in the TIPS method.

Further, the permeation performance and fractionation characteristic of the hollow fiber membrane are thought to change depending on the number, shape, size and the like of fine pores formed in the membrane and the present inventors focused on that point. Specifically, the present inventors focused on a possibility of making the membrane denser to enhance fractionation characteristic. On the other hand, the present inventors focused on a possibility of reducing permeation performance if the entire membrane is made dense.

Accordingly, the present inventors inferred it important to thin such a dense layer part as to exhibit fractionation characteristic in a membrane thickness direction, i.e. a separation layer directly involved in separation in order to obtain a hollow fiber membrane excellent in both permeation performance and fractionation characteristic. Then, the present inventors inferred that both permeation performance and fractionation characteristic could be improved by forming a hollow fiber membrane having an asymmetric structure in which a part necessary such as to maintain the strength and the like of the hollow fiber membrane, i.e. a part other than the separation layer is a coarse porous body. Then, the present inventors studied membrane materials and inferred that permeation performance and fractionation characteristic could be controlled by controlling a structure inside the membrane as described above.

As a result of various studies, the present inventors found out that the above object of obtaining a hollow fiber membrane excellent in permeation performance and fractionation characteristic and also in strength could be achieved by the following invention.

An embodiment according to the present invention is described above, but the present invention is not limited to this.

A hollow fiber membrane according to one aspect of the present invention is a porous hollow fiber membrane containing a vinylidene fluoride-based resin and having a gradient structure in which a pore diameter of pores in the hollow fiber membrane gradually becomes smaller at least toward one of inner and outer peripheral surface sides. Specifically, the hollow fiber membrane according to this embodiment is a hollow fiber membrane having an asymmetric structure in a membrane thickness direction. Since, because of this, this hollow fiber membrane has the gradient structure in which the pore diameter of the pores in the membrane gradually becomes smaller at least toward one of the inner and outer peripheral surface sides, a dense layer part thought to be involved in fractionation characteristic, the other part formed with relatively large pores (fine pores) and the like are thought to be formed. For example, since the dense layer part thought to be involved in fractionation characteristic is formed on an outer surface or the like and the relatively large pores (fine pores) are formed in the other part, a reduction of permeation performance is thought to be suppressed.

Further, the hollow fiber membrane according to this embodiment is hydrophilized by containing a crosslinked body of a polyvinylpyrrolidone-based resin. First, the hollow fiber membrane according to this embodiment is thought to have a tendency to have relatively high hydrophobicity since containing the vinylidene fluoride-based resin. Even such a hollow fiber membrane is thought to be able to enhance hydrophilicity by containing the crosslinked body of the polyvinylpyrrolidone-based resin. Further, it is thought that the falling-off of the polyvinylpyrrolidone-based resin can be suppressed and an effect of enhancing hydrophilicity can be maintained by not only merely containing the polyvinylpyrrolidone-based resin, but also containing the crosslinked body of the polyvinylpyrrolidone-based resin. By enhancing hydrophilicity in this way, it is thought that the hollow fiber membrane can be formed with suitable pores as described above and permeability for liquid containing water can be further enhanced. Further, the obtained hollow fiber membrane has excellent strength since containing the vinylidene fluoride-based resin.

From the above, the hollow fiber membrane according to this embodiment is thought to be a hollow fiber membrane excellent in both permeation performance and fractionation characteristic and also in strength. Further, it is thought that the hollow fiber membrane according to this embodiment can enhance contamination resistance by enhancing hydrophilicity.

Further, the above hollow fiber membrane has the gradient structure in which the pore diameter of the pores in the membrane gradually become smaller at least toward one of the inner and outer peripheral surface sides as described above. Specifically, there is no particular limitation if a diameter of fine pores formed in the outer peripheral surface of the hollow fiber membrane (outer peripheral side fine pore diameter) is smaller than a diameter of fine pores formed in the inner peripheral surface of the hollow fiber membrane (inner peripheral side fine pore diameter). Specifically, the outer peripheral side fine pore diameter is preferably 0.01 to 1 µm, more preferably 0.1 to 0.5 µm and further preferably 0.1 to 0.3 µm. Further, the inner peripheral side fine pore diameter also not particularly limited, but preferably 1 to 20 µm, more preferably 1 to 10 µm and further preferably 2 to 8 µm. Further, a ratio of the inner peripheral side fine pore diameter to the outer peripheral side fine pore diameter (inner peripheral side fine pore diameter/ outer peripheral side fine pore diameter) is larger than 1 and preferably 10 to 100, more preferably 20 to 50 and further preferably 30 to 50. From these, the hollow fiber membrane has the gradient structure in which the size (pore diameter) of the pores in the membrane gradually becomes smaller from the inner peripheral surface side toward the outer peripheral surface side to satisfy the outer peripheral side fine pore diameter and the inner peripheral side fine pore diameter. Note that the diameter here is an average value of the diameters and, for example, an arithmetic average value or the like of the diameters.

The vinylidene fluoride-based resin contained in the hollow fiber membrane is a main component of the hollow fiber membrane and, specifically, preferably 85 mass % or more and more preferably 90 to 99.9 mass %.

This vinylidene fluoride-based resin is not particularly limited if it is a vinylidene fluoride-based resin capable of constituting the hollow fiber membrane. Specific examples of this vinylidene fluoride-based resin include a homopolymer of vinylidene fluoride and a vinylidene fluoride copolymer. This vinylidene fluoride copolymer is not particularly limited if it is a copolymer having a recurring unit based on vinylidene fluoride. Specific examples of the vinylidene fluoride copolymer include copolymers of at least one kind selected from a group composed of vinyl fluoride, ethylene tetrafluoride, propylene hexafluoride and trifluorochloroethylene and vinylidene fluoride. Among the above examples, polyvinylidene fluoride, which is a homopolymer of vinylidene fluoride is preferable as the vinylidene fluoride-based resin. Further, the resins of the above examples may be singly used or two or more kinds may be combined and used as the vinylidene fluoride-based resin.

A molecular weight of the vinylidene fluoride-based resin differs depending on the usage and the like of the hollow fiber membrane, but is preferably, for example, 50,000 to 1,000,000 in weight-average molecular weight. If the molecular weight is too small, the strength of the hollow fiber membrane tends to be reduced. Further, if the molecular weight is too large, a membrane forming property of the hollow fiber membrane tends to be reduced. Further, in the case of using a hollow fiber membrane for water treatment exposed to chemical cleaning, that hollow fiber membrane is required to have higher performances. Thus, the hollow fiber membrane is required to be excellent in strength and, further, excellent in membrane forming property to obtain a suitable hollow fiber membrane. Thus, the weight-average molecular weight of the vinylidene fluoride-based resin contained in the hollow fiber membrane is preferably 100,000 to 900,000 and more preferably 150,000 to 800,000.

The above hollow fiber membrane is hydrophilized by containing not only the vinylidene fluoride-based resin, but also the crosslinked body of polyvinylpyrrolidone-based resin as described above. This polyvinylpyrrolidone-based resin is not particularly limited if it is a resin containing vinylpyrrolidone in molecules. Specific examples of this polyvinylpyrrolidone-based resin include copolymers of polyvinylpyrrolidone, vinylpyrrolidone and vinylacetate and copolymers of vinylpyrrolidone and vinylcaprolactam. Among the above examples, polyvinylpyrrolidone is preferable as the polyvinylpyrrolidone-based resin. Further, the resins of the above examples may be singly used or two or more kinds may be combined and used as the polyvinylpyrrolidone-based resin.

A degree of crosslinking of the crosslinked body of the polyvinylpyrrolidone-based resin is not particularly limited. An example of the degree of crosslinking is a degree of crosslinking that the polyvinylpyrrolidone-based resin is not detected from filtrate in the case of passage through the obtained hollow fiber membrane. The degree of crosslinking that the polyvinylpyrrolidone-based resin is not detected is, specifically, as follows.

First, after pure water is passed through the hollow fiber membrane and flushing cleaning is performed, an aqueous solution containing 40 volume % of ethanol is circulated through the hollow fiber membrane for 1 hour. A polyvinylpyrrolidone-based resin concentration of this circulated ethanol aqueous solution is measured. An extraction amount of the polyvinylpyrrolidone-based resin per membrane area of 1 m² is calculated from this polyvinylpyrrolidone-based resin concentration and a membrane area of the used hollow fiber membrane. This calculated extraction amount per membrane area of 1 m² is preferably 300 mg or less, more preferably 100 mg or less or further preferably 10 mg or less.

A content of the crosslinked body of the polyvinylpyrrolidone-based resin is not particularly limited if it is an amount capable of sufficiently exhibiting effects caused by containing the crosslinked body of the polyvinylpyrrolidone-based resin, i.e. an amount capable of suitably hydrophilizing the hollow fiber membrane containing the vinylidene fluoride-based resin. Specifically, the content of the crosslinked body of the polyvinylpyrrolidone-based resin is preferably 0.1 mass % or higher and lower than 15 mass %, more preferably 0.1 to 10 mass % and further preferably 0.5 to 5 mass % with respect to the mass of the hollow fiber membrane. If the content is too small, the hydrophilicity of the hollow fiber membrane tends not to be sufficiently enhanced. Thus, contamination resistance is not sufficiently enhanced, suitable pores (fine pores) cannot be formed in the hollow fiber membrane and permeability for liquid containing water tends to be unable to be sufficiently enhanced. Further, if the content is too large, permeation performance tends to be reduced. This is thought to be because the moldability of the hollow fiber membrane is first reduced and a suitable hollow fiber membrane tends to be difficult to form. This is also thought to be because the polyvinylpyrrolidone-based resin in the hollow fiber membrane swells and a reduction of water permeability is likely to occur such as due to the closing of the fine pores of the membrane. From these, it is thought that, if the content of the crosslinked body of the polyvinylpyrrolidone-based resin is within the above range, the hollow fiber membrane containing the vinylidene fluoride-based resin can be appropriately hydrophilized and hydrophilicity can be enhanced while a reduction of water permeability such as due to the closing of the fine pores of the membrane is suppressed. Thus, the hollow fiber membrane excellent in permeation performance and further in contamination resistance is thought to be obtained while excellent fractionation characteristic is maintained.

A method for measuring the content of the crosslinked body of the polyvinylpyrrolidone-based resin is not particularly limited, but the content can be, for example, measured as follows. Specifically, the obtained hollow fiber membrane is analyzed for a trace of nitrogen and the content can be measured from the amount of presence of nitrogen (N). More specifically, the obtained hollow fiber membrane and a polyvinylpyrrolidone-based resin single body are respectively analyzed for a trace of nitrogen and amounts of presence of nitrogen (N) are measured. From these amounts, the content of the crosslinked body of the polyvinylpyrrolidone-based resin is calculated.

A K-value of the polyvinylpyrrolidone-based resin is preferably 30 to 120, more preferably 50 to 120 and further preferably 60 to 120. Note that this K-value of the polyvinylpyrrolidone-based resin is a K-value of the polyvinylpyrrolidone-based resin before crosslinking. Further, the K-value is a viscosity characteristic value corrected with the molecular weight. This K-value can be known, for example, from the description of a catalog or the like, but can be calculated using Fikentscher equation. This K-value can be calculated, for example, by applying a relative viscosity value at 25° C. measured by a capillary viscometer to the following Fikentscher equation.

$$K\text{-value}=(1.5 \log \eta_{rel}-1)/(0.15+0.003c)+(300c \log \eta_{rel}+(c+1.5c \log \eta_{rel})^2)^{1/2}/(0.15c+0.003c^2)$$

In equation, $\eta_{rel}$ denotes the relative viscosity of the polyvinylpyrrolidone-based resin aqueous solution as a measurement object to water and c denotes a concentration (mass %) of the measurement object of the polyvinylpyrrolidone-based resin aqueous solution as the measurement object.

If the K-value of the polyvinylpyrrolidone-based resin is too small, even if the polyvinylpyrrolidone-based resin is crosslinked, it is unlikely to remain in the hollow fiber membrane containing the vinylidene fluoride-based resin and it tends to be difficult to suitably maintain the hydrophilicity of the hollow fiber membrane. Further, if the K-value of the polyvinylpyrrolidone-based resin is too large, the membrane forming property is reduced and it tends to be difficult to produce a suitable hollow fiber membrane. From these, it is thought that the polyvinylpyrrolidone-based resin easily suitably remains in the hollow fiber membrane containing the vinylidene fluoride-based resin and the hollow fiber membrane can be suitably hydrophilized if the polyvinylpyrrolidone-based resin having such a K-value is used. Thus, hydrophilicity can be enhanced while a reduction of water permeability such as due to the closing of fine pores of the membrane is suppressed, wherefore it is thought that the permeability of liquid containing water can be improved. Therefore, the hollow fiber membrane excellent in permeation performance and further in contamination resistance is thought to be obtained while excellent fractionation characteristic is maintained.

Further, a pure water permeability coefficient K of the hollow fiber membrane is preferably $1 \times 10^{-15}$ m² or larger and $22 \times 10^{-15}$ m² or smaller. Here, the pure water permeability coefficient K is a permeability coefficient when pure water is passed through the hollow fiber membrane and calculated using the following Equation (1) in accordance with Darcy's law.

$$K=(\mu \cdot T \cdot Q)/(\Delta P \cdot A) \quad (1)$$

In Equation (1), K denotes the permeability coefficient (m²). Further, $\mu$ denotes a viscosity (Pa·sec) and, here, denotes a viscosity (Pa·sec) of pure water. Further, T denotes a membrane thickness (m) and, here, denotes a thickness (m) of the hollow fiber membrane. Further, Q denotes a flow rate (m³ sec) and, here, denotes a permeate water flow rate (m³/sec). Further, $\Delta P$ denotes an inter-membrane differential pressure (Pa). Further, A denotes a membrane area (m²).

Next, a method for measuring the pure water permeability coefficient K is described.

The measurement method of the pure water permeability coefficient K is not particularly limited if the pure water permeability coefficient K can be calculated by the above Equation (1). Specifically, the measurement method of the pure water permeability coefficient K is, for example, as follows.

First, a wet treatment of immersing the hollow fiber membrane as a measurement object in an aqueous solution containing 50 mass % of ethanol for 15 minutes and, thereafter, washing it with pure water for 15 minutes is performed. Using a porous hollow fiber membrane module in which one end of the hollow fiber membrane having this wet treatment applied thereto is sealed, pure water utilized as raw water is filtered under external pressure at a filter pressure of 100 kPa and a temperature of 25° and a water permeation amount per unit time is measured. This measured water permeation amount is converted into water permeation amounts per unit membrane area, unit time and unit pressure and a water permeation amount ($L/m^2/hr$) at an inter-membrane differential pressure of 0.1 MPa is obtained at each of effective lengths of 10 cm, 15 cm, 20 cm, 25 cm and 30 cm. This obtained measurement data on the water permeation amounts is substituted into Darcy's equation to calculate Darcy's permeability coefficient K at each effective length.

Thereafter, a graph is plotted with the effective length taken on a horizontal axis and Darcy's permeability coefficient K taken on a vertical axis, Darcy's permeability coefficient K at an effective length of 0 cm is calculated from an extrapolation value of the obtained plot, and this is set as the pure water permeability coefficient K in the present invention.

Next, this pure water permeability coefficient K is described.

The pure water permeability coefficient K is a coefficient of passage resistance when pure water passes through the hollow fiber membrane. Specifically, as the calculated pure water permeability coefficient K increases, the pure water passage resistance of the hollow fiber membrane is smaller and water more easily flows. On the other hand, as the calculated pure water permeability coefficient K decreases, the pure water passage resistance of the hollow fiber membrane is larger and water is difficult to flow. More specifically, the pure water permeability coefficient K is large if the hollow fiber membrane is such a structure that individual fine pores present in the membrane are large, porosity is large and a pressure loss is small. On the other hand, the pure water permeability coefficient K is small if the hollow fiber membrane is such a dense structure that individual fine pores present in the membrane are small and porosity is small.

The pure water permeability coefficient K is a fixed value without depending on a pressure variation during measurement and a length (membrane thickness) of a passage part of the hollow fiber membrane if the structure of the hollow fiber membrane, particularly the structure in the membrane thickness direction is uniform. On the other hand, a variation of the pure water permeability coefficient K according to the membrane thickness indicates that the structure of the hollow fiber membrane, e.g. porosity, fine pore diameter and fine pore shape, changes in the membrane thickness direction.

Specifically, the pure water permeability coefficient K of the hollow fiber membrane having an asymmetric structure changing in the membrane thickness direction from an area where the pure water permeability coefficient K is small to an area where the pure water permeability coefficient K is large is as follows. First, it is assumed that Ks denotes K of the area where the pure water permeability coefficient K is small and K1 denotes K of the area where the pure water permeability coefficient K is large. It is also assumed that Ts denotes a thickness of the area where the pure water permeability coefficient K is small, T1 denotes a thickness of the area where the pure water permeability coefficient K is large and T denotes a thickness (membrane thickness) of the entire hollow fiber membrane. In such a case, the pure water permeability coefficient K of the hollow fiber membrane is defined as in the following Equation (2).

$$T/K = Ts/Ks + T1/K1 \quad (2)$$

From this, the pure water permeability coefficient K of the hollow fiber membrane having the asymmetric structure is determined based on ratios of the area where the pure water permeability coefficient K is small and the area where the pure water permeability coefficient K is large to the membrane thickness of the entire hollow fiber membrane and the magnitude of a difference between absolute values of Ks and K1. That is, the pure water permeability coefficient K of the hollow fiber membrane varies according to a degree of asymmetry of the hollow fiber membrane. Specifically, if the degree of asymmetry is small, the pure water permeability coefficient K of the hollow fiber membrane tends to be small. Further, if the degree of asymmetry is large, the pure water permeability coefficient K of the hollow fiber membrane tends to be large. By calculating the pure water permeability coefficient K of the hollow fiber membrane in this way, the pure water permeation performance and the degree of asymmetry of the hollow fiber membrane can be evaluated. Specifically, it can be understood that pure water permeation performance is high if the pure water permeability coefficient K of the hollow fiber membrane is large and the degree of asymmetry has changed if the pure water permeability coefficient K of the hollow fiber membrane varies.

Here, the pure water permeability coefficient K of the hollow fiber membrane according to this embodiment is a value contributing to the membrane structure as described above. This pure water permeability coefficient K contributing to the membrane structure is preferably $1 \times 10^{-15}$ $m^2$ or larger and $22 \times 10^{-15}$ $m^2$ or smaller, more preferably $2 \times 10^{-15}$ $m^2$ or larger and $17 \times 10^{-15}$ $m^2$ or smaller and further preferably $2.3 \times 10^{-15}$ $m^2$ or larger and $10 \times 10^{-15}$ $m^2$ or smaller. If this pure water permeability coefficient K is too small, there is a tendency that the passage resistance of pure water increases and it is difficult to exhibit sufficient permeation performance. Further, if this pure water permeability coefficient K is too small, there is a tendency that excellent permeation performance can be exhibited, but fractionation characteristic is excessively reduced. From these, it is thought that permeation performance for liquid containing water can be made excellent while a reduction of fractionation characteristic is suppressed when the pure water permeability coefficient K is within the above range.

A fractionation particle diameter of the hollow fiber membrane according to this embodiment is preferably 0.5 μm or smaller. This fractionation particle diameter means a particle diameter of minimum particles capable of blocking passage through the hollow fiber membrane. Specific examples include particle diameters causing the blocking rate by the hollow fiber membrane to be 90%. Such a fractionation particle diameter is preferably as small as possible, but about 0.001 μm is a lower limit to maintain excellent permeation performance. Thus, a minimum value of the fractionation particle diameter is about 0.001 μm and preferably about 0.01 μm in terms of permeation performance. From these, the fractionation particle diameter is preferably 0.5 μm or smaller, more preferably 0.001 to 0.5 μm, further preferably 0.01 to 0.5 μm and particularly preferably 0.02 to 0.1 μm. If the fractionation particle diameter of the hollow fiber membrane is too large, there is a tendency that fractionation characteristic is reduced to narrow an application range of targets to be removed even if permeation performance is enhanced. From this, if the fractionation particle diameter of the hollow fiber membrane is within the above range, excellent fractionation characteristic can be exhibited while a reduction of permeation performance is suppressed.

The application range of the hollow fiber membrane for targets to be removed differs depending on the fractionation particle diameter. Specifically, if the fractionation particle diameter is 0.05 to 0.1 μm, the hollow fiber membrane can be applied to remove microorganisms and viruses as a precision filtration membrane. Further, if the fractionation particle diameter is 0.001 to 0.01 μm, the hollow fiber membrane can be applied to remove micropathogens and proteins as an ultrafiltration membrane. Further, if the fractionation particle diameter is 0.002 μm or smaller, the hollow fiber membrane can be applied for desalting as a reverse osmosis membrane.

From the above, the hollow fiber membrane according to this embodiment can exhibit excellent permeation performance also at a membrane thickness capable of realizing required strength while having excellent fractionation characteristic enabling an application to remove microorganisms and viruses as a precision filtration membrane if the fractionation characteristic is within the above range.

Further, a water permeation amount of the hollow fiber membrane according to this embodiment at an inter-membrane differential pressure of 0.1 MPa is preferably 1000 to 40000 L/m²/hr, more preferably 3000 to 30000 L/m²/hr and further preferably 3500 to 20000 L/m²/hr. If the water permeation amount is too small, permeation performance tends to be inferior. If the water permeation amount is too large, fractionation characteristic tends to be reduced. From this, a hollow fiber membrane more excellent in permeation performance and fractionation characteristic is obtained if the water permeation amount is within the above range. Note that the water permeation amount at an inter-membrane differential pressure of 0.1 MPa corresponds to a pure water permeation speed (FW) at an inter-membrane differential pressure of 0.1 MPa in a wet state to be described later.

The pure water permeability coefficient of the hollow fiber membrane according to this embodiment is preferably $0.4 \times 10^{-11} \times L$ (m²) or larger and $6 \times 10^{-11} \times L$ (m²) or smaller, more preferably $0.8 \times 10^{-11} \times L$ (m²) or larger and $4 \times 10^{-11} \times L$ (m²) or smaller and further preferably $1 \times 10^{-11} \times L$ or larger and $3 \times 10^{-11} \times L$ (m²) or smaller when the thickness of the hollow fiber membrane is L (m). Specifically, in the hollow fiber membrane, a gradient of a graph with the membrane thickness L (m) taken on a horizontal axis and the pure water permeability coefficient K (m²) taken on a vertical axis is preferably $0.4 \times 10^{-11}$ to $6 \times 10^{-11}$ or smaller, more preferably $0.8 \times 10^{-11}$ to $4 \times 10^{-11}$ and further preferably $1 \times 10^{-11}$ to $3 \times 10^{-11}$.

The pure water permeability coefficient K is a value depending on the intra-membrane structure of the hollow fiber membrane as described above, and a value which does not change even if the membrane thickness varies when the intra-membrane structure of the hollow fiber membrane is homogeneous in the membrane thickness direction. If the gradient is within the above range, the structure of the hollow fiber membrane is thought to be suitably asymmetric. Specifically, a dense layer part thought to be involved in fractionation characteristic is present such as near one surface and the other part is thought to be less likely to contribute to a reduction of permeability and have relatively large fine pores formed inside. It is thought that this dense layer part works as a separation layer and the other part works as a support layer. This support layer is thought to be a so-called three-dimensional network structure in which coarse pores called microvoids are not present in a membrane cross-section and communicating pores are present in any of three dimensional directions. Further, it is thought that, even if the thickness of the entire hollow fiber membrane changes, the thickness of the dense layer part working as the separation layer hardly changes and the part working as a support layer changes if the gradient is within the above range. Thus, it is thought that the dense layer part thought to be involved in fractionation characteristic can realize the hollow fiber membrane more excellent in permeation performance while maintaining excellent fractionation characteristic without being thick even if the thickness of the hollow fiber membrane is increased. Specifically, it is thought that the gradient is within the above range because a ratio of the separation layer to the thickness of the entire hollow fiber membrane tends to be reduced even if the thickness of the hollow fiber membrane is increased. From these, there is a tendency that a degree of asymmetry of the fine pores and the like in the membrane thickness direction is not sufficiently high if the gradient is too small and sufficient permeation performance cannot be exhibited if the gradient is too large. Further, there is a tendency that the degree of asymmetry becomes too large and the part supposed to function as the support layer does not sufficiently function as the support layer such as due to the formation of microvoids if the gradient is too large. Specifically, the strength of the hollow fiber membrane tends to be reduced and, depending on cases, it tends to become difficult to suitably produce the hollow fiber membrane. Therefore, if the gradient is within the above range, the hollow fiber membrane more excellent in permeation performance is thought to be obtained while excellent fractionation characteristic is maintained.

The hollow fiber membrane according to this embodiment is preferably composed of a single layer. Specifically, even if the hollow fiber membrane has the asymmetric structure in which the size of fine pores and the like differ in the membrane thickness direction, a material thereof is preferably composed of the same layer. More specifically, the hollow fiber membrane is preferably a single layer other than being composed of the separation layer and the support layer separately formed and laminated as described above. By doing so, the hollow fiber membrane more excellent in permeation performance and fractionation characteristic and hardly causing damages such as peeling-off in the membrane is obtained.

This is thought to be caused by the following.

It is thought that the dense layer part thought to be involved in fractionation characteristic as described above is thin when permeation performance is high as in the hollow fiber membrane according to this embodiment. In such a case, if it is attempted to separately produce such a dense layer, it may not be possible to suitably form this layer. In contrast, it is thought that the dense layer part can be formed to be uniform in a plane direction if the dense layer part and the other part are formed of the same layer, i.e. a single layer. Further, it is thought that the occurrence of peeling-off at an interface thereof and the like can be sufficiently suppressed if the dense layer part and the other part are formed of a single layer.

From these, the hollow fiber membrane more excellent in permeation performance and fractionation characteristic and hardly causing damages such as peeling-off in the membrane is thought to be obtained.

A strength of the hollow fiber membrane is not particularly limited if the hollow fiber membrane is usable. Specifically, the strength of the hollow fiber membrane is preferably 3 to 15 N/mm², more preferably 3 to 10 N/mm² and further preferably 3 to 7 N/mm² in tensile strength. Further, specifically, the strength of the hollow fiber membrane is preferably 30 to 250%, more preferably 50 to 200% and further preferably 70 to 200% in tensile elongation. Further, the hollow fiber membrane can be suitably used if tensile strength and tensile elongation as the strength of the hollow fiber membrane are within the above ranges. Note that tensile strength is obtained from a load at the time of the fracture of the hollow fiber membrane when the hollow fiber membrane cut into a predetermined size is pulled at a predetermined speed, and tensile elongation indicates the elongation of the hollow fiber membrane when the hollow fiber membrane is fractured.

The above hollow fiber membrane is hydrophilized by containing the crosslinked body of the polyvinylpyrrolidone-based resin as described above. This hollow fiber membrane is preferably produced by a production method described later. Specifically, this hollow fiber membrane is preferably such that the crosslinked body is obtained by crosslinking the polyvinylpyrrolidone-based resin contained in the hollow fiber membrane before crosslinking in forming the hollow fiber membrane before crosslinking. This crosslinked body is preferably formed by crosslinking the polyvinylpyrrolidone-based resin kneaded into the hollow fiber membrane before crosslinking. By kneading the polyvinylpyrrolidone-based resin, which is a hydrophilic resin, together with the vinylidene fluoride-based resin into ingredients of the hollow fiber membrane in forming the hollow fiber membrane before crosslinking, the hollow fiber membrane more flexible and excellent in stretchability is obtained. This is thought to be because the kneaded hydrophilic resin works as a plasticizer by kneading the hydrophilic resin into the ingredients of the hollow fiber membrane in forming the hollow fiber membrane before crosslinking. In contrast, if no hydrophilic resin is contained in the ingredients of the hollow fiber membrane in forming the hollow fiber membrane before crosslinking, the obtained hollow fiber membrane may be poor in flexibility.

The hollow fiber membrane is excellent in flexibility when containing the crosslinked body obtained by crosslinking the polyvinylpyrrolidone-based resin contained in the hollow fiber membrane before crosslinking in forming the hollow fiber membrane before crosslinking. Thus, even if the hollow fiber membrane itself is bent, deformed or the like, highly practical strength capable of sufficiently suppressing the occurrence of liquid leakage caused such as by fracture, i.e. fiber leakage can be realized because strength is within the above ranges. Also from this perspective, it is preferable to contain the crosslinked body obtained by crosslinking the polyvinylpyrrolidone-based resin contained in the hollow fiber membrane before crosslinking in forming the hollow fiber membrane before crosslinking. From these, the hollow fiber membrane according to this embodiment is a hollow fiber membrane excellent in strength by having not only high tensile strength, but also high tensile elongation as described above and can be suitably used.

The pure water permeation speed of the hollow fiber membrane in a dry state preferably satisfies the following relationship. Further, when the hollow fiber membrane contains the crosslinked body obtained by crosslinking the polyvinylpyrrolidone-based resin contained in the hollow fiber membrane before crosslinking in forming the hollow fiber membrane before crosslinking, the pure water permeation speed in a dry state often satisfies the following relationship. Also from this perspective, it is preferable to contain the crosslinked body obtained by crosslinking the polyvinylpyrrolidone-based resin contained in the hollow fiber membrane before crosslinking in forming the hollow fiber membrane before crosslinking.

Specifically, a ratio (FD/FW) of the pure water permeation speed (FD) at an inter-membrane differential pressure of 0.1 MPa in the dry state to a pure water permeation speed (FW) at an inter-membrane differential pressure of 0.1 MPa in the wet state is preferably 40% or higher, more preferably 60% or higher and further preferably 80% or higher.

Note that the pure water permeation speed (FD) at an inter-membrane differential pressure of 0.1 MPa in the dry state and the pure water permeation speed (FW) at an inter-membrane differential pressure of 0.1 MPa in the wet state are permeation speeds which differ depending on whether the hollow fiber membrane is in the wet state or in the dry state and are measured under the same other conditions.

The pure water permeation speed (FD) at an inter-membrane differential pressure of 0.1 MPa in the dry state is, for example, a permeation speed measured by the following method. First, the hollow fiber membrane as a measurement object is dried. This drying is not particularly limited if the hollow fiber membrane can be dried, but is, for example, drying at 60° C. In a blowing constant temperature drier for 24 hours or longer. More specifically, the hollow fiber membrane in the dry state is a hollow fiber membrane having reached a state with moisture sufficiently equilibrium to that of 60° C. air in the drier by such drying. Using this hollow fiber membrane in the dry state, pure water as raw water is filtered under external pressure at a filter pressure of 0.1 MPa and a temperature of 25° C. to measure a water permeation amount per minute. This measured water permeation amount is converted into water permeation amounts per unit membrane area, per unit time and per unit pressure to obtain a pure water permeation speed (L/m²/hr: LMH).

The pure water permeation speed (FW) at an inter-membrane differential pressure of 0.1 MPa in the wet state is measured by a method similar to the FD measurement method except in that the hollow fiber membrane in the wet state is used instead of the hollow fiber membrane in the dry state. A wet treatment of wetting the hollow fiber membrane is not particularly limited, but the hollow fiber membrane is, for example, immersed in an aqueous solution containing 50 mass % of ethanol for 20 minutes and, thereafter, washed with pure water for 20 minutes.

A ratio (FD10/FW) of a pure water permeation speed (FD10) at an inter-membrane differential pressure of 0.1 MPa in the dry state after the above wet and dry states are alternately repeated ten times to FW is preferably equal to FD/FW. Specifically, the ratio of FD10 to FW (FD10/FW) is preferably 40% or higher, more preferably 60% or higher and further preferably 80% or higher. Further, not only the surfaces of the hollow fiber membrane, but also the inside of the micropores of the hollow fiber membrane are hydrophilized. Specifically, FD/FW and FD10/FW are substantially 100% if the entire hollow fiber membrane is hydrophilized and high hydrophilicity of the entire hollow fiber membrane is ensured during measurement. Note that, in such a case, FD/FW and FD10/FW may exceed 100% due to various factors such as a measurement error. If there are places where the polyvinylpyrrolidone-based resin, which is a hydrophilic resin, is peeled off and/or places which are not sufficiently hydrophilized, these places serve as water passage resistance. Thus, FW and the pure water permeation speed (FD10) at an inter-membrane differential pressure of 0.1 MPa in the wet state after the wet and dry states are alternately repeated ten times are reduced according to a ratio of these places. Thus, FD/FW and FD10/FW are reduced to become lower than 100%. Note that the dry state after the wet and dry states are alternately repeated ten times specifically means to repeat an operation of setting the hollow fiber membrane in the wet state to the dry state, i.e. an operation of setting the hollow fiber membrane in the wet state to the dry state and, thereafter, setting the hollow fiber membrane in the dry state to the wet state again ten times.

In a hollow fiber membrane obtained by a conventional hydrophilizing method such as an immersion method described in Japanese Unexamined Patent Application Publication No, H-09-512857, a pure water permeation speed (FD10) at an inter-membrane differential pressure of 0.1 MPa in a dry state after a wet state and a dry state are respectively alternately repeated ten times generally tends to be reduced. This is thought to be caused by the following. First, in the conventional hydrophilizing method such as an immersion method, a hydrophilic resin is applied only to an outer surface of a hollow fiber membrane and crosslinked. Thus, it is thought that the hydrophilic resin is unlikely to enter the inside of micropores of the hollow fiber membrane and an anchoring effect of the hollow fiber membrane and a crosslinked body of the hydrophilic resin tends to be reduced. From this, it is thought that the crosslinked body of the hydrophilic resin is easily peeled off and the peeling-off of the crosslinked body of the hydrophilic resin progresses if the wet state and the dry state are repeated ten times. Thus, it is thought that FD10 tends to be reduced.

Further, when the hollow fiber membrane is dried, the pure water permeation speed generally tends to be lower than that before drying. Specifically, FD tends to be smaller than FW. Further, as described above, FD10 tends to be reduced in the hollow fiber membrane obtained by the conventional hydrophilizing method. From these, a humidifying treatment, a protection treatment and the like are often applied to the hollow fiber membrane before drying to suppress these permeation speed reductions in the case of the hollow fiber membrane obtained by the conventional hydrophilizing method. In contrast, in the hollow fiber membrane according to this embodiment, reductions of FD and FD10 can be suppressed without performing such treatments if the hollow fiber membrane contains the crosslinked body obtained by crosslinking the polyvinylpyrrolidone-based resin contained in the hollow fiber membrane before crosslinking in forming the hollow fiber membrane before crosslinking.

The shape of the hollow fiber membrane according to this embodiment is not particularly limited. The hollow fiber membrane may be in the form of a hollow fiber, which may be open on one longitudinal side and open or closed on the other side. The hollow fiber membrane is, for example, in the form of a hollow fiber, which is open on one longitudinal side and closed on the other side. Further, the shape on the open side of the hollow fiber membrane is, for example, as shown in FIG. 1. Note that FIG. 1 is a partial perspective view of the hollow fiber membrane according to the embodiment of the present invention.

An outer diameter R1 of the hollow fiber membrane is preferably 0.5 to 7 mm, more preferably 1 to 2.5 mm and further preferably 1 to 2 mm. Such an outer diameter is a suitable size as the hollow fiber membrane provided in a device for realizing a separation technology using the hollow fiber membrane.

An inner diameter R2 of the hollow fiber membrane is preferably 0.4 to 3 mm, more preferably 0.6 to 2 mm and further preferably 0.6 to 1.2 mm. If the inner diameter of the hollow fiber membrane is too small, a resistance of permeate liquid (in-pipe pressure loss) increases and a flow tends to be defective. Further, if the inner diameter of the hollow fiber membrane is too large, the shape of the hollow fiber membrane cannot be maintained and the hollow fiber membrane tends to be easily squeezed, distorted or the like.

The membrane thickness T of the hollow fiber membrane is 0.2 to 1 mm, more preferably 0.25 to 0.5 mm and further preferably 0.25 to 0.4 mm. If the membrane thickness of the hollow fiber membrane is too small, deformation such as distortion tends to easily occur due to insufficient strength. Further, if the membrane thickness is too large, it tends to be difficult to obtain a suitable membrane structure such as due to difficulty to suppress the formation of microvoids. Depending on cases, strength may be reduced. On the other hand, since the hollow fiber membrane according to this embodiment can maintain high water per rateability even if the membrane thickness is changed, it can also be formed into a hollow fiber membrane having a relatively large membrane thickness according to a use environment of a module or the like in terms of strength.

If the outer diameter R1, the inner diameter R2 and the membrane thickness T of the hollow fiber membrane are respectively in the above ranges, the hollow fiber membrane has a suitable size as a hollow fiber membrane provided in a device for realizing a separation technology using the hollow fiber membrane and the device can be miniaturized.

Further, the hollow fiber membrane production method according to this embodiment is not particularly limited if the aforementioned hollow fiber membrane can be produced. This production method is, for example, as follows. This production method is, for example, a method with a step of preparing a membrane forming solution containing a vinylidene fluoride-based resin, a polyvinylpyrrolidone-based resin and a solvent (preparing step), a step of extruding the membrane forming solution into a hollow fiber (extruding step), a step of solidifying the membrane forming solution extruded into a hollow fiber and forming a hollow fiber membrane before crosslinking (forming step) and a crosslinking step of crosslinking the polyvinylpyrrolidone-based resin in the hollow fiber membrane before crosslinking. Since such a production method includes the crosslinking step of crosslinking the polyvinylpyrrolidone-based resin in the hollow fiber membrane, the hollow fiber membrane can be suitably produced. Specifically, a hollow fiber membrane containing a crosslinked body of a polyvinylpyrrolidone-based resin can be suitably produced.

First, the preparing step in the production method according to this embodiment is not particularly limited if the membrane forming solution containing the vinylidene fluoride-based resin, the polyvinylpyrrolidone-based resin and the poor solvent can be prepared. Specifically, the preparing step is, for example, a method for heating and stirring ingredients of the membrane forming solution. Further, the ingredients are preferably kneaded during heating and stirring. Specifically, a method for mixing the ingredients of the membrane forming solution, i.e. the vinylidene fluoride-based resin, the polyvinylpyrrolidone-based resin and the solvent at a predetermined ratio and kneading them in a heated state is preferable. By doing so, it is thought that the membrane forming solution in which each component as an ingredient of the membrane forming solution is uniformly dispersed is obtained and the hollow fiber membrane can be suitably produced. Further, a two-axis kneading facility, a kneader, a mixer and the like can be, for example, used during kneading.

The solvent used here is preferably a poor solvent of the vinylidene fluoride-based resin. The poor solvent of the vinylidene fluoride-based resin is, for example, a solvent which can compatibly dissolved with the vinylidene fluoride-based resin into one phase at a specific temperature or higher and phase-separated due to a reduction of compatibility caused by a temperature drop.

The above preparing step is preferably performed at a temperature below a melting point of the vinylidene fluoride-based resin. Specifically, a temperature during the preparation of this membrane forming solution is preferably below the melting point of the vinylidene fluoride-based resin. Further, in the case of using a poor solvent of the vinylidene fluoride-based resin as the solvent, the preparing step is preferably performed at a temperature below the melting point of the vinylidene fluoride-based resin and higher than a temperature at which phase separation caused by the temperature drop starts. Specifically, the preparing step is preferably performed such that the temperature during the preparation of this membrane forming solution is below the melting point of the vinylidene fluoride-based resin and higher than the temperature at which phase separation caused by the temperature drop starts. Furthermore, the temperature during the preparation of this membrane forming solution is more preferably 60° C. or higher and below the melting point of the vinylidene fluoride-based resin and more preferably 90 to 140° C. If this temperature is too low, a viscosity of the membrane forming solution increases and the hollow fiber membrane having a suitable membrane structure tends to be not obtained. Specifically, a suitable three-dimensional network structure cannot be formed in the layer working as the support layer of the hollow fiber membrane, spherocrystals and microvoids are easily formed in that layer and the strength of the obtained hollow fiber membrane tends to be reduced. Further, even if this temperature is too high, the hollow fiber membrane having a suitable membrane structure tends to be not obtained. Specifically, due to the thermal degradation of the polyvinylpyrrolidone-based resin, a suitable three-dimensional net work structure cannot be formed in the layer working as the support layer of the hollow fiber membrane, microvoids are easily formed in that layer or conversely that layer tends to become a dense layer. As a result, there is a tendency that it is difficult to obtain the hollow fiber membrane excellent both in fractionation characteristic and permeation performance. From these, it is thought that the membrane forming solution containing the vinylidene fluoride-based resin, the poor solvent and the polyvinylpyrrolidone-based resin can be suitably obtained while the occurrence of damages of the polyvinylpyrrolidone-based resin such as due to heat is suppressed if the temperature during the preparing step is within the above range. Thus, the suitable membrane forming solution is obtained, wherefore it is thought to be possible to produce the hollow fiber membrane excellent in permeation performance and fractionation characteristic and also in strength.

The membrane forming solution obtained here is used to produce the hollow fiber membrane. At that time, the obtained membrane forming solution is preferably sufficiently desecrated. After being measured using a metering pump such as a gear pump, the membrane forming solution is used to produce the hollow fiber membrane to be described later.

The aforementioned resins can be used as the vinylidene fluoride-based resin and the polyvinylpyrrolidone-based resin.

The solvent is not particularly limited if it can be used as a solvent contained in the membrane forming solution used in producing the hollow fiber membrane. Further, the solvent is preferably a poor solvent of the vinylidene fluoride-based resin as described above. Further, this poor solvent is not particularly limited if it can be compatibly dissolved with the vinylidene fluoride-based resin into one phase at a specific temperature or higher and phase-separated due to a temperature drop. Further, the poor solvent is preferably a water-soluble solvent. If the water-soluble solvent is used, water can be used in extracting the solvent from the hollow fiber membrane after membrane formation, and the extracted solvent can be treated such as by a biological treatment. Further, examples of the poor solvent include γ-butylotactone, ε-caprolactone, methanol, acetone and caprolactone. Among the examples of the solvent, γ-butylotactone is preferable as the poor solvent in terms of environmental load, safety, cost and the like. Further, as the poor solvent, the examples of solvent may be singly used or two or more kinds may be combined and used.

A content of each component in the membrane forming solution is, for example, as follows. First, a content of the vinylidene fluoride-based resin is 20 to 35 mass parts and more preferably 20 to 30 mass parts with respect to a total mass of the vinylidene fluoride-based resin, the solvent and the polyvinylpyrrolidone-based resin. A content of the poor solvent is 45 to 70 mass parts, more preferably 50 to 70 mass parts and further preferably 55 to 65 mass parts with respect to the total mass. A content of the polyvinylpyrrolidone-based resin is 5 to 20 mass parts, more preferably 8 to 20 mass parts and further preferably 10 to 15 mass parts with respect to the total mass. Further, the content of the vinylidene fluoride-based resin is preferably 1.54 to 4.38, more preferably 1.6 to 3.91 and further preferably 1.67 to 3.13 in mass ratio to that of the polyvinylpyrrolidone-based resin. The hollow fiber membrane containing a suitable content of the crosslinked body of the polyvinylpyrrolidone-based resin can be suitable produced if each component in the membrane forming solution has the above content.

The membrane forming solution has only to contain the vinylidene fluoride-based resin, the polyvinylpyrrolidone-based resin and the solvent and may be composed of these. Further, the membrane forming solution may contain other components besides these three components. Examples of the other components include surfactant, antioxidant, ultraviolet absorber, lubricant, anti-blocking agent, dye, and various additives such as the one for promoting the phase separation of the membrane forming solution. Further, examples of the additive for promoting the phase separation of the membrane forming solution include solvents other the above poor solvent such as glycerin, ethylene glycol, tetraethylene glycol, water, ethanol and methanol, and resins such as polyethylene glycol, polyethylene oxide, polyvinyl alcohol, polymethyl methacrylate and polymethyl acrylate. These resins may be copolymers of each resin. Further, as the additive for promoting the phase separation of the membrane forming solution, the above examples of compounds may be singly used or two or more kinds may be combined and used.

Figure 2:
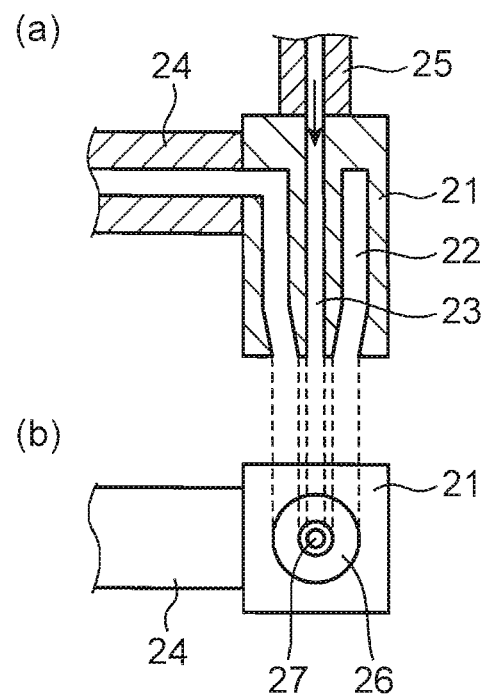
FIG. 2 is a schematic diagram showing an example of a hollow fiber forming nozzle used in a production method according to the embodiment of the present invention.

The extruding step in the production method according to this embodiment is not particularly limited if it is a step of extruding the membrane forming solution into a hollow fiber. The extruding step is, for example, a step of extruding the membrane forming solution from a hollow fiber forming nozzle shown in FIG. 2. Note that FIG. 2 is a schematic diagram showing an example of the hollow fiber forming nozzle used in the production method according to the embodiment of the present invention. A sectional view of this nozzle is shown in section (a) of FIG. 2 and a plan view showing a discharge port of the hollow fiber forming nozzle for discharging the membrane forming solution is shown in section (b) of FIG. 2. Specifically, a hollow fiber forming nozzle 21 here includes a circular ring-shaped outer discharge port 26 and a circular or circular ring-shaped inner discharge port 27 arranged inside the outer discharge port 26. This hollow fiber forming nozzle 21 is provided at an end of a circulating pipe 24 for circulating the membrane forming solution and discharges the membrane forming solution circulated in the circulating pipe 24 from the outer discharge port 26 via a flow passage 22 in the nozzle. Further, this hollow fiber forming nozzle 21 circulates an inner coagulation liquid in a circulation pipe 25 simultaneously with the discharge of the membrane forming solution from the outer discharge port 26 and discharges the inner coagulation liquid from the inner discharge port 27 via a flow passage 23 in the nozzle. By doing so, the membrane forming solution in the form of a hollow fiber extruded from the hollow fiber forming nozzle 21 is brought into contact with the inner coagulation liquid.

This inner coagulation liquid is not particularly limited if it can be used in producing the hollow fiber membrane containing the vinylidene fluoride-based resin. A solubility parameter distance (HSP distance) of the inner coagulation liquid from the membrane forming solution is, for example, preferably 5 to 200 $(MPa)^{1/2}$, more preferably 50 to 200 $(MPa)^{1/2}$ and further preferably 100 to 180 $(MPa)^{1/2}$. By using the inner coagulation liquid having such an HSP distance, the membrane forming solution in the form of a hollow fiber extruded from the hollow fiber forming nozzle can be suitably coagulated from its inner peripheral surface. Specifically, a solvent exchange between the inner peripheral surface side of the membrane forming solution in the form of a hollow fiber extruded from the hollow fiber forming nozzle and the inner coagulation liquid is thought to be performed at a suitable rate. Thus, it is thought that the hollow fiber membrane having a suitable structure near the inner peripheral surface side is obtained and the hollow fiber membrane excellent in both permeation performance and fractionation characteristic can be more suitably produced. Therefore, the hollow fiber membrane excellent in both permeation performance and fractional characteristic can be more suitably produced.

Here, the HSP distance is a parameter for evaluating affinity between a certain substance and another substance and is defined by the following equation using Hansen three-dimensional solubility parameters (dD, dP, dH) (for more information, see non-patent literature: Hansen, Charles (2007). Hansen Solubility Parameters: A user's handbook. Second Edition, Boca Raton, Fla.: CRC Press).

$$HSP\ distance = [4 \times (dD\ solution - dD\ solvent)^2 + (dP\ solution - dP\ solvent)^2 + (dH\ solution - dH\ solvent)^2]^{0.5}$$

Here, dD denotes van der Waals force, dP denotes dipole moment force and dH denotes hydrogen bonding force, two components are judged to have high compatibility, a solvent exchange rate in the NIPS method becomes slower and fine pores in a contact surface becomes coarser in diameter as the HSP distance on three-dimensional coordinates calculated by the above definition equation approaches 0.

Note that although the solubility parameters used in this specification are Hansen parameters, Hoy parameters can be used for those not described as Hansen parameters. Parameters not described as both can be estimated by a Hansen parameter equation (see Allan F. M. Barton, "CRC Handbook of Solubility Parameters and Other Cohesion Parameters", CRC Corp. 1991). In the case of a mixed solvent, parameters calculated from the respective solubility parameters based on their masses in accordance with an additive rule are used.

Further, examples of the solubility parameters are shown in Table 1 below.

TABLE 1

| Solvent | | Solubility Parameters [$(MPa)^{1/2}$] | | |
|---|---|---|---|---|
| | | dD | dP | dH |
| γ-butyrolactone | GBL | 19.0 | 16.6 | 7.2 |
| dimethyl acetamide | DMAc | 16.8 | 11.5 | 10.2 |
| dimethyl formamide | DMF | 17.4 | 13.7 | 11.3 |
| glycerin | Gly | 17.4 | 12.1 | 29.3 |
| Ethylene glycol | EG | 17.0 | 11.0 | 26.0 |
| polyvinylpyrrolidone | PVP | 17.4 | 8.8 | 14.9 |
| water | | 15.5 | 16.0 | 42.4 |

In this embodiment, it is preferable to select the solvent, the polyvinylpyrrolidone-based resin and the inner coagulation liquid contained in the membrane forming solution to satisfy the above HSP distance. Further, the inner coagulation liquid may be composed of a single solvent or two or more kinds of solvents may be combined and used. In the case of combining and using two or more kinds of solvents, the inner coagulation liquid is, for example, a mixed solvent obtained by mixing a solvent having a long HSP distance from the membrane forming solution and a solvent having a short HSP distance from the membrane forming solution at an arbitrary ratio and adjusting the HSP distance from the membrane forming solution. The kinds and number of the solvents to be mixed at that time are not particularly limited. Note that examples of the solvent having a long HSP distance from the membrane forming solution include water and glycerin. Further, examples of the solvent having a short HSP distance from the membrane forming solution include γ-butyrolactone and dimethyl acetamide.

Examples of the mixed solvent used as the inner coagulation liquid include a mixed solvent of dimethyl acetamide and glycerin, a mixed solvent of γ-butyrolactone and glycerin, a mixed solvent of γ-butyrolactone and ethylene glycol, a mixed solvent of γ-butyrolactone and water, a mixed solvent of dimethyl acetamide and water, a mixed solvent of dimethyl acetamide and ethylene glycerin and a mixed solvent of dimethyl formamide and water. Among these, the mixed solvent of γ-butyrolactone and glycerin and the mixed solvent of dimethyl acetamide and water are preferable in terms of good moldability of the hollow fiber membrane.

A temperature of the inner coagulation liquid is preferably 40 to 170° C. In terms of ensuring the homogeneity of the inner coagulation liquid. Specifically, the temperature of the inner coagulation liquid is preferably adjusted between 40 and 170° C.

The forming step in the production method according to this embodiment is not particularly limited if it is a step capable of forming the hollow fiber membrane by coagulating the extruded membrane forming solution in the form of a hollow fiber. This forming step is, for example, a step of forming the hollow fiber membrane by bringing the extruded membrane forming solution in the form of a hollow fiber into contact with an outer coagulation liquid. More specifically, this forming step is a step of immersing the extruded membrane forming solution in the form of a hollow fiber in the outer coagulation liquid stored in an outer coagulation bath.

This outer coagulation liquid is not particularly limited if it can coagulate the extruded membrane forming solution in the form of a hollow fiber by being brought into contact with the extruded membrane forming solution in the form of a hollow fiber. The outer coagulation liquid is specifically an aqueous solution containing water, a salt or a solvent. Here, examples of the salt include various salts such as sulfates, chlorides, nitrates and acetates. Among these, sodium sulfate is preferable. Further, the aqueous solution containing the salt is preferably 30 to 300 g/L, more preferably 50 to 300 g/L and further preferably 100 to 280 g/L in salt concentration. This concentration tends to make the hollow fiber membrane having a suitable membrane structure difficult to obtain when it is too low or too high. Specifically, if this concentration is too low, the solvent exchange rate in the forming step becomes faster, the obtained hollow fiber membrane becomes excessively dense and permeation performance tends to be reduced. Further, if this concentration is too high, the solvent exchange rate in the forming step becomes slower and the fractionation characteristic of the obtained hollow fiber membrane tends to be reduced.

A temperature of the outer coagulation liquid is not particularly limited if it s a temperature capable of coagulating the extruded membrane forming solution in the form of a hollow fiber by being brought into contact with the extruded membrane forming solution in the form of a hollow fiber. This temperature of the outer coagulation liquid is preferably higher than a temperature at which phase separation due to a temperature drop starts in the case of using a poor solvent of the vinylidene fluoride-based resin as the solvent. It is thought that the hollow fiber membrane excellent in both permeation performance and the fractionation characteristic can be suitably produced with the temperature of the outer coagulation liquid set at such a temperature. This is thought to be caused by the following. First, in producing the membrane forming solution, the membrane forming solution in the form of a hollow fiber is brought into contact with the outer coagulation liquid in a state where phase separation by the temperature change does not occur by using not a good solvent for the vinylidene fluoride-based resin, but a poor solvent for the vinylidene fluoride-based resin. By doing so, the solvent exchange between the solvent in the membrane forming solution and the outer coagulation liquid occurs to coagulate the resin in the membrane forming solution. Thus, in the case of using a good solvent, the solvent exchange rate is thought to be more suitable than that of the conventional so-called NIPS method. Therefore, it is thought that the hollow fiber membrane excellent both in permeation performance and fractionation characteristic can be suitably produced.

The temperature of the outer coagulation liquid is preferably higher than the temperature at which phase separation due to the temperature change starts and specifically preferably 45° C. or higher and more preferably 50° C. or higher. Further, the temperature of the outer coagulation liquid is preferably not higher than a boiling point of the outer coagulation liquid, more preferably not higher than 90° C. and further preferably not higher than 85° C. If the temperature of the outer coagulation liquid is too low, the obtained hollow fiber membrane becomes dense and it tends to be difficult to form an asymmetric structure. Further, when the temperature of the outer coagulation liquid drops to or below the temperature at which phase separation due to the temperature change, the TIPS method is adopted and it becomes difficult to form a suitable hollow fiber membrane. Further, if the temperature of the outer coagulation liquid is too high, a viscosity of the membrane forming solution decreases, whereby fractionation characteristic tends to be reduced and water permeation performance tends to be enhanced. Furthermore, if the temperature of the outer coagulation liquid is not lower than the boiling temperature thereof, the outer coagulation liquid boils and vibrates, wherefore the production of the hollow fiber membrane tends to be unstable.

The temperature at which phase separation starts is a temperature to which the temperature of a solution containing the vinylidene fluoride-based resin, the poor solvent and the polyvinylpyrrolidone-based resin, e.g. the above membrane forming solution is reduced to start phase separation. The temperature at which phase separation starts is specifically measured as follows (for more information, see non-patent literature: Structure of Polymer Alloy/Physical Property Control and Latest Technology, Toshiaki Ougizawa, Kazunori Se, Akio Imai, Information Organization). First, a slide glass and a cover glass are placed on a stage of an optical microscope with a temperature controller and heated to reach 120° C. A membrane forming solution in a homogeneous phase state is sandwiched between these heated slide glass and cover glass. Then, the temperature of these slide glass and the cover glass is decreased or increased little by little, e.g. decreased by 3° C. every time, white turbidity (due to a difference between refractive indices of two phases) produced during phase separation is visually confirmed, and a temperature at which that confirmation is made is measured. This temperature is set as the temperature at which phase separation starts. Specifically, this measurement method is a method for measurement with the temperature at which white turbidity is even partially confirmed set as the temperature at which phase separation starts (phase separation starting temperature), assuming that the membrane forming solution is in a homogeneous phase state when being transparent and is in a phase-separated state when being opaque.

In the forming step, the extruded membrane forming solution in the form of a hollow fiber may run in gas, normally in air before being brought into contact with the outer coagulation liquid. Specifically, in the forming step, the extruded membrane forming solution in the form of a hollow fiber may be brought into contact with the outer coagulation liquid after running in gas. A running distance in gas is not particularly limited and, for example, preferably 5 to 300 mm. This running in gas enables the solvent exchange between the extruded membrane forming solution in the form of a hollow fiber and the inner coagulation liquid to be suitably performed, the shape of the hollow fiber is stabilized and spinnability is improved. Note that this running in gas may not be performed in the production method according to this embodiment.

In the production method according to this embodiment, the hollow fiber membrane formed in the forming step may be stretched in a longitudinal direction. This stretching method is not particularly limited, but is, for example, a stretching treatment in a water bath, e.g. in a heated water bath. Note that if a force applied for stretch is released after stretch, the hollow fiber membrane contracts in the longitudinal direction. If such stretch and shrink are applied, the permeation performance of the hollow fiber membrane is improved. This is thought to be because individual pores present in the membrane are torn open to become communicating pores, communication property in the membrane is improved and permeation performance is improved. Further, if such stretch and shrink are applied, there is an advantage of making a direction of the fiber of the hollow fiber membrane homogeneous and improving strength. Note that such stretch and shrink need not be performed in the production method according to this embodiment.

In the production method according to this embodiment, the hollow fiber membrane formed in the forming step may be washed. A washing method is, for example, a method for washing the hollow fiber membrane with hot water in a water bath of 80° C. or higher. By this hot water washing, the hydrophilicity of the hollow fiber membrane is suitably improved. This is thought to be because the polyvinylpyrrolidone-based resin in the hollow fiber membrane is dispersed in the membrane by this hot water washing.

The crosslinking step in the production method according to this embodiment is not particularly limited if the polyvinylpyrrolidone-based resin contained in the hollow fiber membrane can be crosslinked. Examples of this crosslinking step include a step of immersing the hollow fiber membrane (hollow fiber membrane before crosslinking) in an aqueous solution containing a radical initiator, a step of immersing the hollow fiber membrane in strong acid or strong alkali, a step of thermally treating the hollow fiber membrane and a step of treating the hollow fiber membrane with radiation. Among the above steps, the step of immersing the hollow fiber membrane in the aqueous solution containing the radical initiator is preferable as the crosslinking step in terms of suppressing the degradation of the vinylidene fluoride-based resin and facilitating handling.

In the step of immersion in the aqueous solution containing the radical initiator, a heating treatment is preferably performed during or after immersion. Further, the aqueous solution containing the radical initiator has only to be an aqueous solution containing a radical initiator capable of starting a crosslinking reaction of the polyvinylpyrrolidone-based resin and is, for example, an aqueous solution containing 1 mass % of radical initiator. Examples of the radical initiator include sodium persulfate, ammonium persulfate and hydrogen peroxide. Among these, hydrogen peroxide is preferable because the hollow fiber membrane having high permeation performance is easily obtained.

A heating temperature in the thermally treating step has only to be a temperature capable of starting the crosslinking reaction of the polyvinylpyrrolidone-based resin and is preferably about 170 to 200° C.

Further, the hollow fiber membrane according to this embodiment can be subjected to membrane filtration. Specifically, a module is, for example, formed as follows using hollow fiber membranes and this module can be used for membrane filtration. More specifically, a predetermined number of the hollow fiber membranes according to this embodiment are bundled and cut to a predetermined length and filled into a casing having a predetermined shape, and an end part of the hollow fiber bundle is fixed to the casing by a thermosetting resin such as a polyurethane resin or an epoxy resin, thereby forming the module. Various structures such as a type in which both ends of the hollow fiber membranes are open and fixed, of a type in which one ends of the hollow fiber membranes are open and fixed and the other ends are sealed, but not fixed are known as the structure of this module. The hollow fiber membranes according to this embodiment can be used in any of the module structures.

Figure 3:
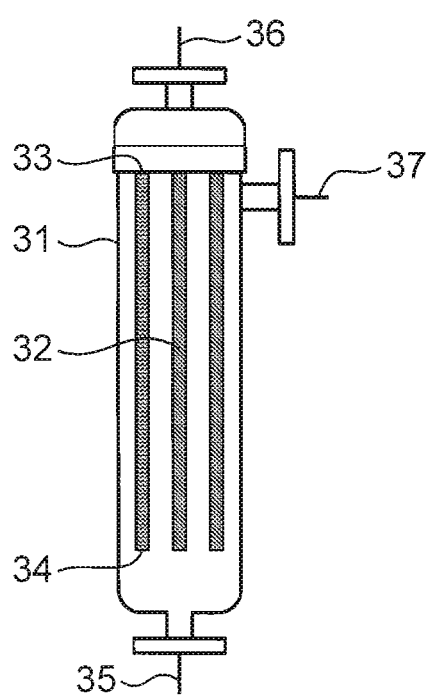
FIG. 3 is a schematic diagram showing an example of a membrane filter device with hollow fiber membranes according to the embodiment of the present invention.

The hollow fiber membranes according to this embodiment are formed into a module as described above and can be, for example, incorporated into a membrane filter device as shown in FIG. 3. Note that FIG. 3 is a schematic diagram showing an example of the membrane filter device with the hollow fiber membranes according to the embodiment of the present invention. The membrane filter device 31 includes a membrane module 32 obtained by forming the hollow fiber membranes into a module as described above. In this membrane module 32, a hollow part of each hollow fiber membrane is open at an upper end part 33 and sealed by an epoxy-based resin at a lower end part 34. For example, the membrane module 32 is formed by using 70 hollow fiber membranes having an effective membrane length of 100 cm. This membrane filter device 31 is configured such that a liquid as a treatment object introduced through an inlet port 35 is filtered by the membrane module 32, and the filtered liquid (filtrate water) and the like are discharged from an outlet port 36. By doing so, filtration using the hollow fiber membranes is performed. Note that air introduced into the membrane filter device 31 is discharged from an air vent port 37.

The hollow fiber membranes according to this embodiment are formed into such a module and used for various applications such as water purification, drinking water production, industrial water production and waste water treatment.

This specification discloses various modes of technology as described above. Out of those, main technologies are summarized below.

A hollow fiber membrane according to one aspect of the present invention is a porous hollow fiber membrane containing a vinylidene fluoride-based resin, has a gradient structure in which a pore diameter of pores in the hollow fiber membrane gradually becomes smaller at least toward one of inner and outer peripheral surface sides, and the hollow fiber membrane is hydrophilized by containing a crosslinked body of a polyvinylpyrrolidone-based resin.

According to such a configuration, the hollow fiber membrane excellent in both permeation performance and fractionation characteristic and also in strength is obtained.

This is thought to be caused by the following.

First, since this hollow fiber membrane has the gradient structure in which the pore diameter of the pores in the membrane gradually becomes smaller at least toward one of the inner and outer peripheral surface sides, a dense layer part thought to be involved in fractionation characteristic, the other part formed with relatively large pores (fine pores) and the like are thought to be for med. For example, since the dense layer part thought to be involved in fractionation characteristic is formed in an outer surface or the like and the pores (fine pores) formed in the other part are relatively large, a reduction of permeation performance is thought to be suppressed.

Such a hollow fiber membrane is thought to have a tendency to have relatively high hydrophobicity since containing the vinylidene fluoride-based resin. Even such a hollow fiber membrane is thought to be able to enhance hydrophilicity by containing the crosslinked body of the polyvinylpyrrolidone-based resin. Further, it is thought that the falling-off of the polyvinylpyrrolidone-based resin can be suppressed and an effect of enhancing hydrophilicity can be maintained by not only merely containing the polyvinylpyrrolidone-based resin, but also containing the crosslinked body of the polyvinylpyrrolidone-based resin. By enhancing hydrophilicity in this way, it is thought that the hollow fiber membrane can be formed with suitable pores as described above and permeability for liquid containing water can be further enhanced. Further, the obtained hollow fiber membrane has excellent strength since containing the vinylidene fluoride-based resin.

From these, a hollow fiber membrane excellent in both permeation performance and fractionation characteristic and also in strength is thought to be obtained. Further, it is thought that contamination resistance can also be enhanced by enhancing hydrophilicity.

Further, in the above hollow fiber membrane, a content of the crosslinked body is preferably 0.1 mass % or higher and below 15 mass %.

According to such a configuration, a hollow fiber membrane more excellent in permeation performance and further in contamination resistance is obtained while excellent fractionation characteristic is maintained.

This is thought to be because the hollow fiber membrane containing the vinylidene fluoride-based resin can be suitably hydrophilized and hydrophilicity can be enhanced while a reduction of permeability such as due to the closing of the fine pores of the membrane is suppressed.

Further, in the above hollow fiber membrane, a K-value of the polyvinylpyrrolidone-based resin is preferably 30 to 120.

According to such a configuration, a hollow fiber membrane more excellent in permeation performance and further in contamination resistance is obtained while excellent fractionation characteristic is maintained.

This is thought to be caused by the following. The polyvinylpyrrolidone-based resin having such a K-value easily suitably remains in the hollow fiber membrane containing the vinylidene fluoride-based resin and the hollow fiber membrane can be suitably hydrophilized. Thus, hydrophilicity can be enhanced while a reduction of permeability such as due to the closing of the fine pores of the membrane is suppressed, wherefore it is thought that the permeability of liquid containing water can be improved.

From these, a hollow fiber membrane more excellent in permeation performance and further in contamination resistance is obtained while excellent fractionation characteristic is maintained.

Further, in the above hollow fiber membrane, a water permeation amount at an inter-membrane differential pressure of 0.1 MPa is preferably 1000 to 40000 L/m$^2$/hr and a fractionation particle diameter is preferably 0.001 to 0.5 μm.

According to such a configuration, a hollow fiber membrane more excellent in permeation performance and fractionation characteristic is obtained.

Further, the above hollow fiber membrane is composed of a single layer.

According to such a configuration, a hollow fiber membrane more excellent in permeation performance and fractionation characteristic and hardly causing damages such as peeling-off in the membrane is obtained.

This is thought to be caused by the following.

It is thought that the dense layer part thought to be involved in fractionation characteristic as described above is thin when permeation performance is high as in the hollow fiber membrane according to one aspect of the present invention. In such a case, if it is attempted to separately produce such a dense layer, it may not be possible to suitably form this layer. In contrast, it is thought that the dense layer part can be formed to be uniform in a plane direction if the dense layer part and the other part are formed of the same layer, i.e. a single layer. Further, it is thought that the occurrence of peeling-off at an interface and the like can be sufficiently suppressed if the dense layer part and the other part are formed of a single layer.

From these, a hollow fiber membrane more excellent in permeation performance and fractionation characteristic and hardly causing damages such as peeling-off in the membrane is thought to be obtained.

Further, in the above hollow fiber membrane, the crosslinked body is preferably obtained by crosslinking the polyvinylpyrrolidone-based resin contained in the hollow fiber membrane before crosslinking in forming the hollow fiber membrane before crosslinking.

According to such a configuration, a hollow fiber membrane more excellent in permeation performance and fractionation characteristic and further in strength by having not only high tensile strength, but also high tensile elongation is obtained.

Further, a method for producing a hollow fiber membrane according to another aspect of the present invention is a method for producing the above hollow fiber membrane and includes a step of preparing a membrane forming solution containing a vinylidene fluoride-based resin, a polyvinylpyrrolidone-based resin and a solvent, a step of extruding the membrane forming solution into a hollow fiber, a step of solidifying the membrane forming solution extruded into a hollow fiber and forming a hollow fiber membrane before crosslinking and a crosslinking step of crosslinking the polyvinylpyrrolidone-based resin in the hollow fiber membrane before crosslinking.

According to such a configuration, the hollow fiber membrane can be suitably produced.

Further, in the above method for manufacturing the hollow fiber membrane, the membrane forming solution is preferably such that a content of the vinylidene fluoride-based resin is 1.54 to 4.38 in mass ratio to that of the polyvinylpyrrolidone-based resin.

According to such a configuration, a hollow fiber membrane having a more suitable content of the crosslinked body of the polyvinylpyrrolidone-based resin can be suitably produced.

Further, in the above method for manufacturing the hollow fiber membrane, the crosslinking step is preferably a step of immersing the hollow membrane before crosslinking in an aqueous solution containing a radical initiator.

According to such a configuration, the polyvinylpyrrolidone-based resin contained in the hollow fiber membrane before crosslinking can be easily crosslinked. Thus, the hollow fiber membrane can be more easily produced.

Although the present invention is further specifically described by way of examples below, the scope of the present invention is not limited to these.

EXAMPLES

Example 1

First, a mixture of polyvinylidene fluoride (hereinafter, abbreviated as PVDF in some cases) (Kynar 741 produced by Arkenia K. K.) as a vinylidene fluoride-based resin, γ-butyrolactone (GBL produced by Mitsubishi Chemical Corporation) as a solvent and polyvinylpyrrolidone (Sokalan K-90P produced by BASF Japan, K-value: 90) as a polyvinylpyrrolidone-based resin at a mass ratio of 25:62:13 was prepared. Note that γ-butyrolactone is a poor solvent for polyvinylidene fluoride. Note that a ratio of a content of polyvinylidene fluoride to that of polyvinylpyrrolidone is 25/13, i.e. about 1.92.

After being kneaded, a membrane forming solution obtained by dissolving the above mixture in a dissolving tank under a constant temperature of 95° C. was extruded from a nozzle (hollow fiber membrane forming nozzle) of a double ring structure having an outer diameter of 1.6 mm and an inner diameter of 0.8 mm as shown in FIG. 2. At this time, γ-butyrolactone (GBL produced by Mitsubishi Chemical Corporation) and glycerine (refined glycerine produced by Kao Corporation) were mixed to have a mass ratio of 15:85 under a constant temperature of 65° C. as an inner coagulation liquid and discharged simultaneously with the membrane forming solution. This inner coagulation liquid has an HSP distance of 163 $(MPa)^{1/2}$ from the membrane forming solution.

The membrane forming solution extruded together with inner coagulation liquid is immersed in an outer coagulation liquid of 60° C. containing 180 g/L of a sodium sulfate aqueous solution after a free running distance of 40 mm. By doing so, the membrane forming solution is solidified to obtain a hollow fiber membrane. Note that this outer coagulation liquid is a nonsolvent for polyvinylidene fluoride.

Subsequently, after being stretched and shrank, the obtained hollow fiber membrane was washed with hot water of 90° C. for 2 hours. By doing so, the solvent (γ-butyrolactone) and the polyvinylpyrrolidone-based resin (polyvinylpyrrolidone) were extracted and removed from the hollow fiber membrane. Thereafter, the obtained hollow fiber membrane (hollow fiber membrane before crosslinking) and polyvinylpyrrolidone were heated in a 1% solution of hydrogen peroxide, thereby performing a crosslinking treatment (crosslinking and insolubilizing treatment). A content of a crosslinked body of polyvinylpyrrolidone at this time was 1.9 mass %.

The thus obtained hollow fiber membrane had an outer diameter of 1.3 mm, an inner diameter of 0.8 mm and a membrane thickness of 0.25 mm.

Further, a membrane structure of the hollow fiber membrane according to Example 1 was confirmed using a scanning electron microscope (S-3000N produced by Hitachi, Ltd.). That result is shown in FIGS. 4 to 9.

Figure 4:
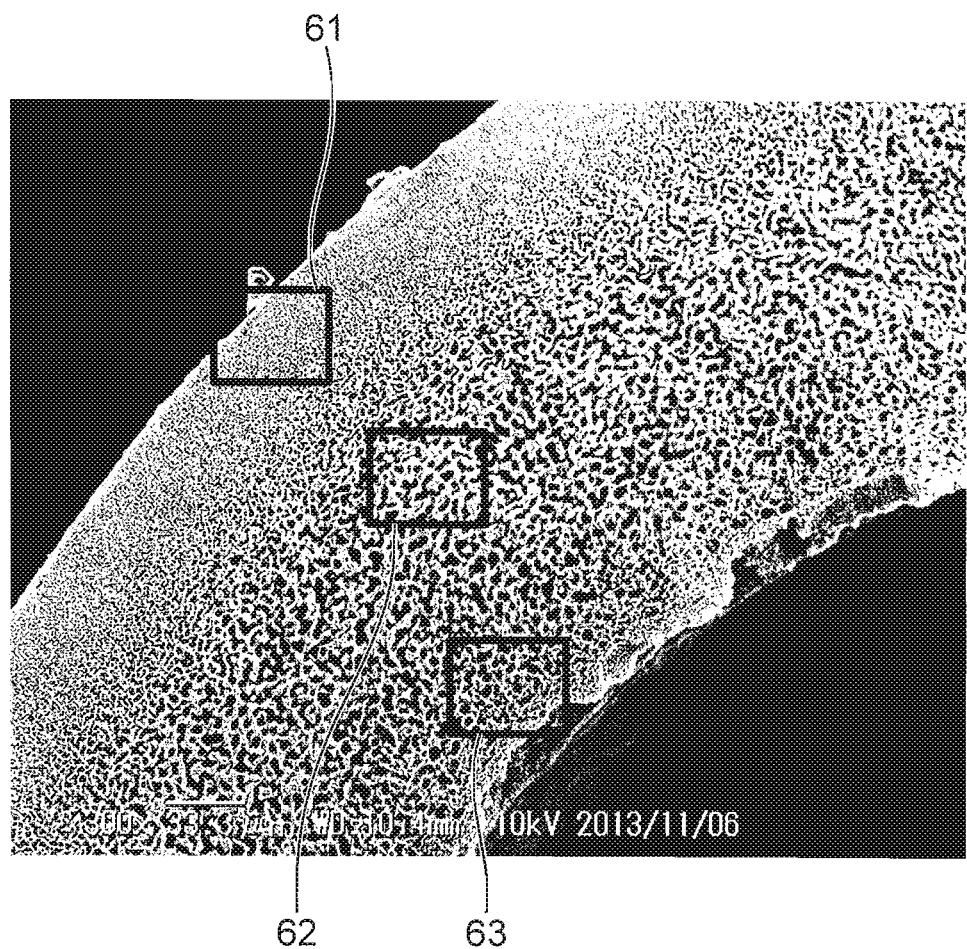
FIG. 4 is a diagram showing a scanning electron microscope picture of a cross-section of a hollow fiber membrane according to Example 1.
Figure 5:
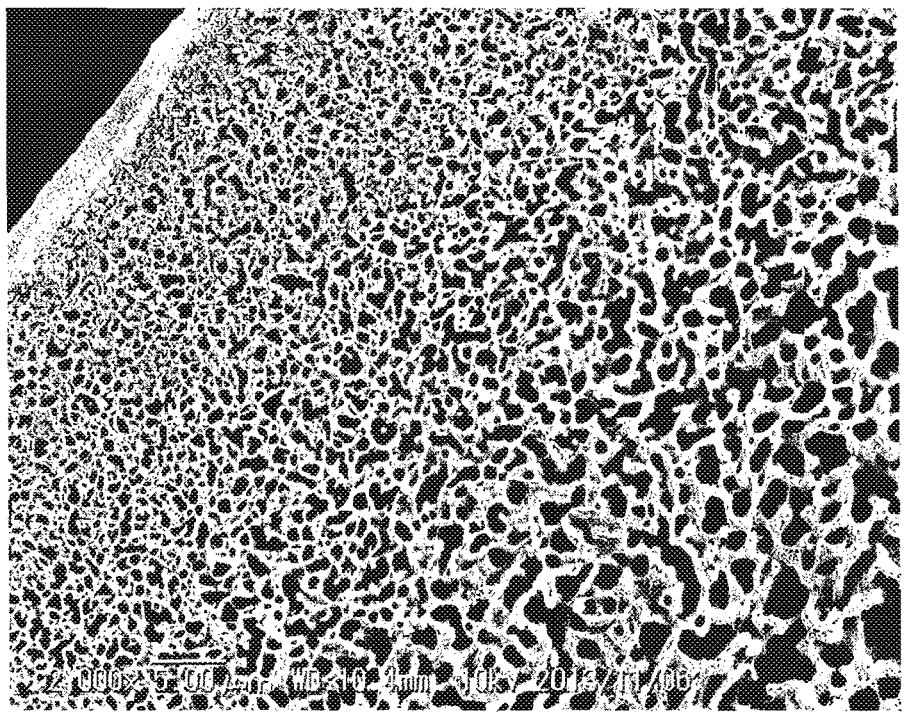
FIG. 5 is a diagram showing a scanning electron microscope picture of the cross-section of the hollow fiber membrane according to Example 1 near an outer peripheral surface.
Figure 6:
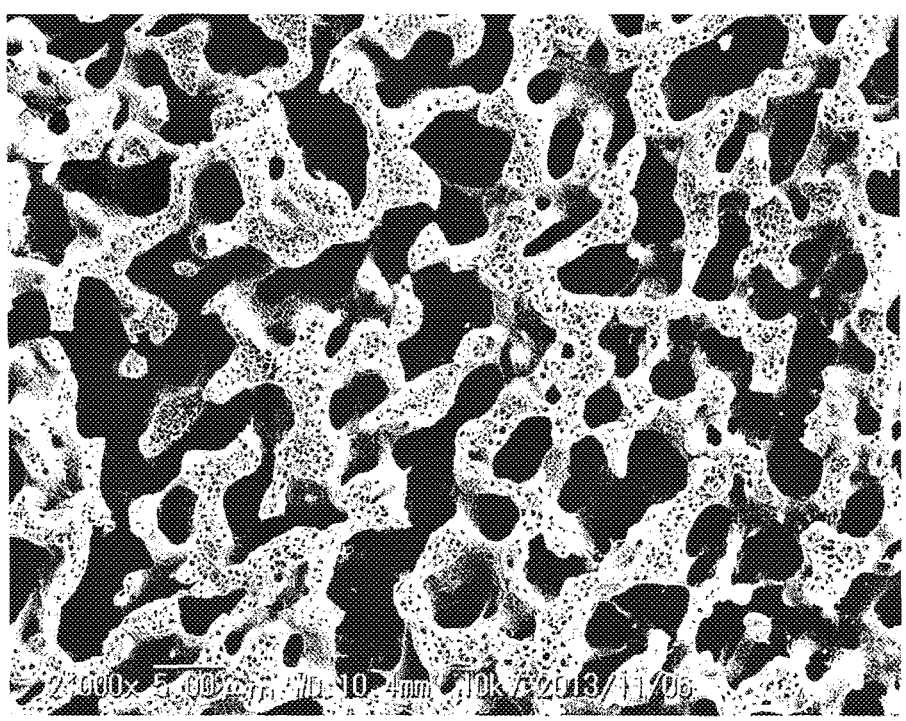
FIG. 6 is a diagram showing a scanning electron microscope picture of the cross-section of the hollow fiber membrane according to Example 1 near a central part.
Figure 7:
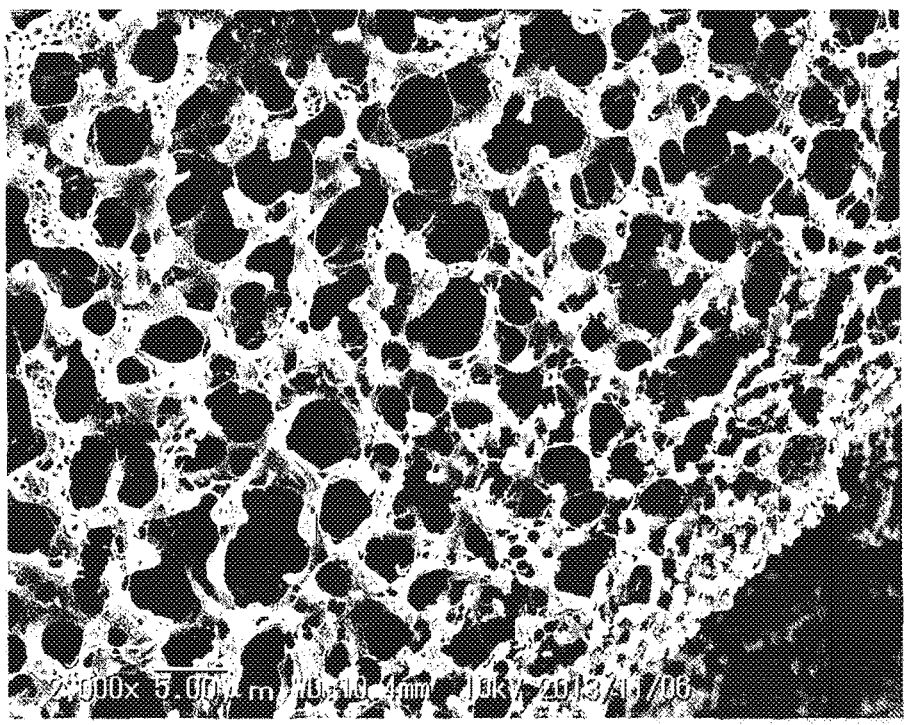
FIG. 7 is a diagram showing a scanning electron microscope picture of the cross-section of the hollow fiber membrane according to Example 1 near an inner peripheral surface.

First, FIG. 4 is a diagram showing a scanning electron microscope picture of a cross-section of the hollow fiber membrane according to Example 1. FIG. 5 is a diagram showing a scanning electron microscope picture of the cross-section of the hollow fiber membrane according to Example 1 near an outer peripheral surface. FIG. 6 is a diagram showing a scanning electron microscope picture of the cross-section of the hollow fiber membrane according to Example 1 near a central part. FIG. 7 is a diagram showing a scanning electron microscope picture of the cross-section of the hollow fiber membrane according to Example 1 near an inner peripheral surface. Specifically, FIG. 5 is a diagram enlargedly showing an enclosed area 61 shown in FIG. 4. FIG. 6 is a diagram enlargedly showing an enclosed area 62 shown in FIG. 4. FIG. 7 is a diagram enlargedly showing an enclosed area 63 shown in FIG. 4.

From these figures, it is found that the hollow fiber membrane according to Example 1 is a porous hollow fiber membrane and has a gradient structure in which a pore diameter of pores in the hollow fiber membrane gradually becomes smaller at least toward one of inner and outer peripheral surface sides. Specifically, it is found that the size of the pores in the hollow fiber membrane successively differs in a thickness direction. Further, it is found that a dense layer part is formed near the outer peripheral surface and the other part is formed to be coarser than that. Specifically, a porosity calculated by binarizing the picture near the outer peripheral surface shown in FIG. 5 using an image measuring software (Image-Pro Plus produced by Planetron Inc.) and determining a threshold value by Otsu method was 34% and a porosity calculated at a threshold value of 210 was 67%. Further, a porosity calculated by similarly binarizing the picture near the inner peripheral surface shown in FIG. 7 using the image measuring software (Image-Pro Plus produced by Planetron Inc.) and determining a threshold value by Otsu method was 50% and a porosity calculated at a threshold value of 210 was 78%.

Figure 8:
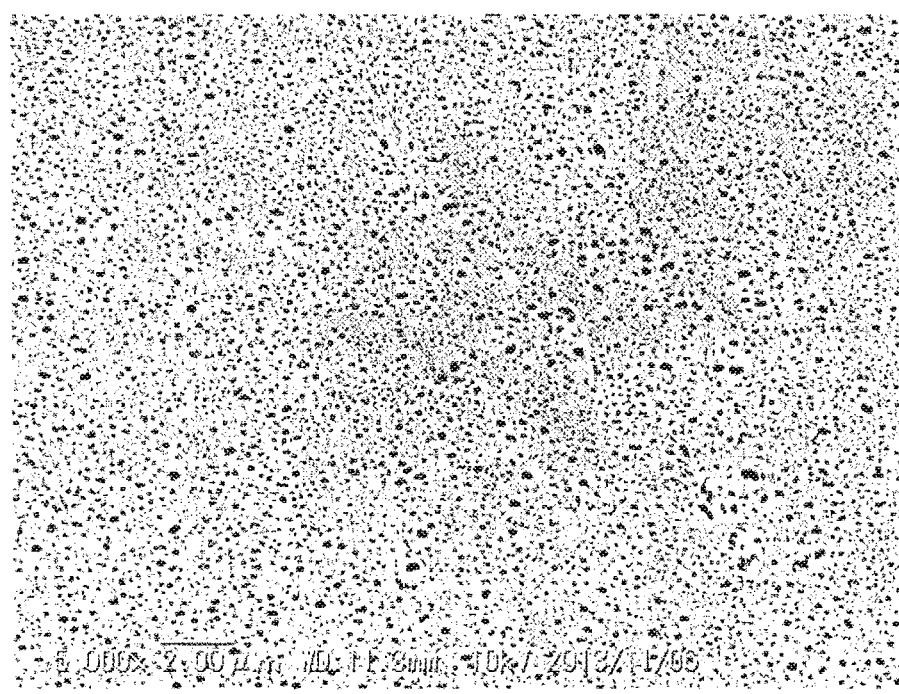
FIG. 8 is a diagram showing a scanning electron microscope picture of the outer peripheral surface of the hollow fiber membrane according to Example 1.
Figure 9:
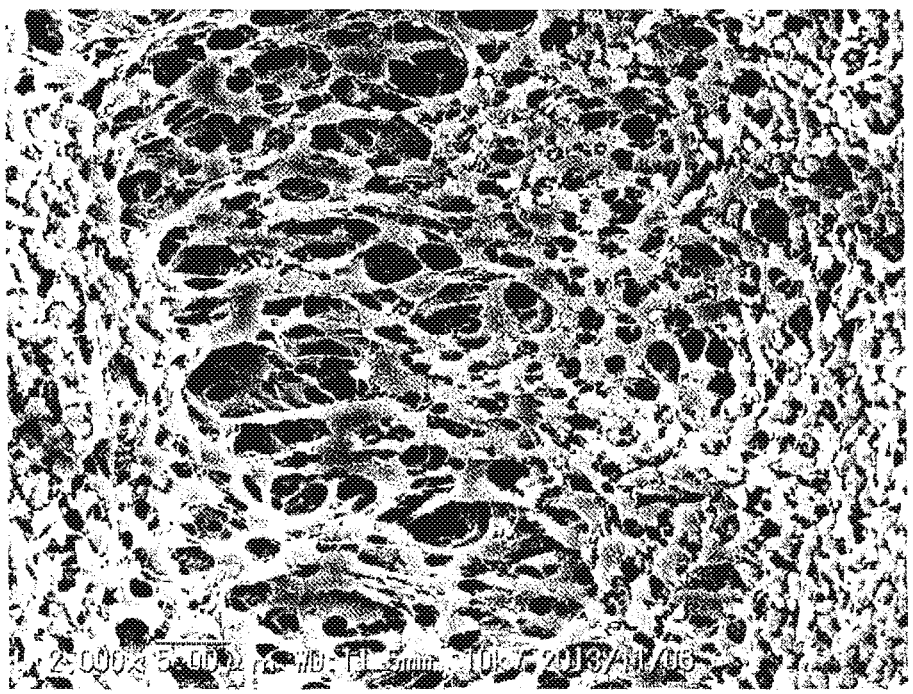
FIG. 9 is a diagram showing a scanning electron microscope picture of the inner peripheral surface of the hollow fiber membrane according to Example 1.

FIG. 8 is a diagram showing a scanning electron microscope picture of the outer peripheral surface of the hollow fiber membrane according to Example 1. FIG. 9 is a diagram showing a scanning electron microscope picture of the inner peripheral surface of the hollow fiber membrane according to Example 1. Also from these figures, it is found that the dense layer part is formed near the outer peripheral surface and the other part is formed to be coarser than that.

An arithmetic average value (outer peripheral side fine pore diameter) of diameters of pores formed in the outer peripheral surface calculated by binarizing the picture of the outer peripheral surface shown in FIG. 8 using the image measuring software (Image-Pro Plus produced by Planetron Inc.) and determining a threshold value by Otsu method was 0.13 μm. Further, an arithmetic average value (inner peripheral side fine pore diameter) of diameters of pores formed in the inner peripheral surface calculated by binarizing the picture of the outer peripheral surface shown in FIG. 9 using the image measuring software (Image-Pro Plus produced by Planetron Inc.) and determining a threshold value by Otsu method was 5 μm. Further, a ratio of the inner peripheral side fine pore diameter to the outer peripheral side fine pore diameter (inner peripheral side fine pore diameter/outer peripheral side fine pore diameter) was 38.

A water permeation amount of the obtained hollow fiber membrane was calculated from the amount of filtrate liquid per unit time in the following operation measured using the hollow fiber membrane and a membrane area.

A membrane filter device 31 as shown in FIG. 3 was produced using these hollow fiber membranes. A membrane module 32 mounted in the membrane filter device 31 includes 20 hollow fiber membranes having an effective membrane length of 20 cm and upper end parts 33 are sealed with an epoxy-based resin. A hollow part of the hollow fiber membrane is open at the upper end part 33 and sealed with the epoxy resin at a lower end part 34. In this membrane filter device 31, pure water was filtered from the outer peripheral surface sides of the hollow fiber membranes via an inlet port 35 and filtrate water was obtained from an outlet port 36 located on the inner peripheral surface sides of the upper end parts. At this time, an adjustment was made to have an inter-membrane differential pressure of 0.1 MPa.

A water permeation amount obtained by this measurement method, i.e. a water permeation amount at an inter-membrane differential pressure of 0.1 MPa was 5000 L/m²/hr. Note that the hollow fiber membranes used in the measurement here are hollow fiber membranes in a swollen state and the water permeation amount here is equivalent to a pure water permeation speed (FW) at an inter-membrane differential pressure of 0.1 MPa in a wet state. Further, FD and FD10 were also respectively measured using hollow fiber membranes in a dry state or hollow fiber membranes in the dry state after the wet state and the dry state were respectively alternately repeated ten times as the hollow fiber membranes.

Further, a fractionation particle diameter of the obtained hollow fiber membrane was measured by the following method.

Blocking rates of at least two kinds of particles (Cataloid SI-550, Cataloid SI-45P, Cataloid SI-80P, etc. produced by JGC Catalysts and Chemicals Ltd.) having different particle diameters were measured, a value of S when R was 90 in the following approximation equation was calculated based on those measurement values and the calculated value was set as a fractionation particle diameter.

$$R=100(1-m\times\exp(-a\times\log(S)))$$

In the above equation, "a" and "m" are constants determined by the hollow fiber membrane and calculated based on the measurement values of the blocking rates of two or more kinds of particles. Note that, for an ultrafiltration area, a molecular weight (weight-average molecular weight) of standard polyethylene oxide (TSKgel produced by Tosoh Corporation) capable of removing more than 90% was written.

The fractionation particle diameter obtained by this measurement method was 0.02 µm.

A pure water permeability coefficient K of the obtained hollow fiber membrane calculated by the above method was $4 \times 10^{-15}$ m$^2$.

A plurality of hollow fiber membranes having different membrane thicknesses were similarly produced except that a discharge amount of the membrane forming solution was changed, and the pure water permeability coefficient K of each hollow fiber membrane was calculated. Thereafter, a change of the pure water permeability coefficient K in relation to a membrane thickness change was plotted and a gradient at that time was calculated. That gradient was $2.29 \times 10^{-11}$.

A strength of the obtained hollow fiber membrane was measured. Specifically, a tensile strength and a tensile elongation of the hollow fiber membrane were measured.

The tensile strength of the hollow fiber membrane was measured as follows.

First, the obtained hollow fiber membrane was cut to a length of 5 cm. This cut piece of the hollow fiber membrane was used as a test piece for measuring the strength.

Subsequently, a tensile test in which the test piece was pulled at a rate of 100 mm/min in water of 25° C. was conducted using an Autograph (AG-Xplus produced by Shimadzu Corporation). At that time, the tensile strength was obtained from a load at the time of fracture.

The tensile strength obtained by this measurement method was 5.2 N/mm$^2$.

Further, the tensile elongation of the hollow fiber membrane was measured as follows.

The tensile elongation was obtained from the elongation of the test piece at the time of fracture in the above tensile test.

The tensile elongation obtained by this measurement method was 180%.

From these, it was found that the hollow fiber membrane according to Example 1 was a hollow fiber membrane excellent in both permeation performance and fractionation characteristic and also in strength.

Further, the hydrophilicity of the hollow fiber membrane was evaluated by conducting the following protein adsorption test.

Figure 10:
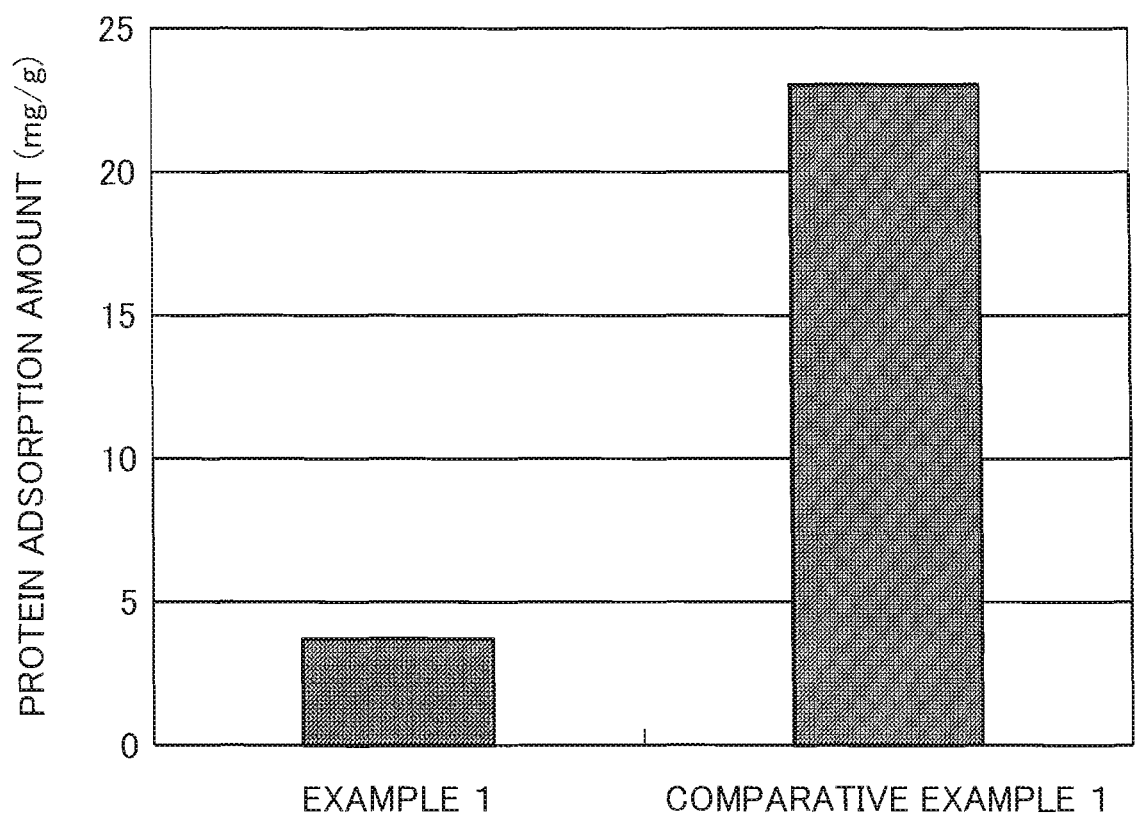
FIG. 10 is a histogram showing an evaluation result on the hydrophilicity of each hollow fiber membrane according to Example 1 and Comparative Example 1.

The obtained hollow fiber membrane was dried and cut to be 2 g in weight in the dry state. After a wet treatment was applied, this cut hollow fiber membrane was immersed in a phosphate buffer solution containing 1000 µm of bovine serum albumin (A7906-10G produced by Sigma Aldrich Co. LLC) for 24 hours. A bovine serum albumin concentration (protein concentration) in the phosphate buffer solution after immersion for 24 hours was measured. From this measurement result, a reduction of the protein concentration caused by the immersion of the hollow fiber membrane was calculated and the amount of protein adhering to the hollow fiber membrane (protein adhesion amount: mg/g) was calculated. This hollow fiber membrane adsorbed with bovine serum albumin was immersed in a phosphate buffer solution containing no bovine serum albumin for 24 hours and a concentration of bovine serum albumin eluted into this phosphate buffer solution was measured. From this measurement result, the amount of the eluted protein (protein elution amount: mg/g) was calculated. Then, the amount of bovine serum albumin adsorbed to the hollow fiber membrane (protein adsorption amount: mg/g) was calculated from a difference between the protein adhesion amount and the protein elusion amount. That result is shown in FIG. 10. Note that a similar evaluation was conducted also for a hollow fiber membrane according to Comparative Example 1 to be described later and that result is also shown in FIG. 10.

Note that FIG. 10 is a histogram showing the evaluation result on the hydrophilicity of each hollow fiber membrane according to Example 1 and Comparative Example 1. Further, a vertical axis represents the above protein adsorption amount (mg/g).

Example 2

A hollow fiber membrane was obtained as in Example 1 except that polyvinylpyrrolidone (PVP K-120 produced by ISP Japan Ltd., K-value: 120) was used as a polyvinylpyrrolidone-based resin. A content of a crosslinked body of polyvinylpyrrolidone of the obtained hollow fiber membrane was 4.9 mass %. An outer peripheral side fine pore diameter, an inner peripheral side fine pore diameter, a ratio of the inner peripheral side fine pore diameter to the outer peripheral side fine pore diameter, a water permeation amount (FW) at an inter-membrane differential pressure of 01 MPa, FD, F10, a pure water permeability coefficient K, a gradient when a change of the pure water permeability coefficient K was plotted in relation to a membrane thickness change, a fractionation particle diameter, a tensile strength and a tensile elongation of this obtained hollow fiber membrane were measured by methods similar to those of Example 1 and shown in Table 1. It was found that this obtained hollow fiber membrane was excellent in both permeation performance and fractionation characteristic and also in strength as in Example 1.

Example 3

A hollow fiber membrane was obtained as in Example 1 except that polyvinylpyrrolidone (PVP K-60 produced by 1SP Japan Ltd., K-value: 60) was used as a polyvinylpyrrolidone-based resin. A content of a crosslinked body of polyvinylpyrrolidone of the obtained hollow fiber membrane was 0.6 mass %. An outer peripheral side fine pore diameter, an inner peripheral side fine pore diameter, a ratio of the inner peripheral side fine pore diameter to the outer peripheral side fine pore diameter, a water permeation amount (FW) at an inter-membrane differential pressure of 01 MPa, FD, F10, a pure water permeability coefficient K, a gradient when a change of the pure water permeability coefficient K was plotted in relation to a membrane thickness change, a fractionation particle diameter, a tensile strength and a tensile elongation of this obtained hollow fiber membrane were measured by methods similar to those of Example 1 and shown in Table 1. It was found that this obtained hollow fiber membrane was excellent in both permeation performance and fractionation characteristic and also in strength as in Example 1.

Example 4

A hollow fiber membrane was obtained as in Example 1 except that a time of washing by hot water applied after the hollow fiber membrane was stretched and shrank was changed to 20 minutes. Note that this Example 4 is an example intended to have a larger remaining amount of a crosslinked body of polyvinylpyrrolidone than the hollow fiber membrane obtained in Example 1 since the washing time is shorter than in Example 1. A content of the crosslinked body of polyvinylpyrrolidone of the obtained hollow fiber membrane was 9.2 mass %. An outer peripheral side fine pore diameter, an inner peripheral side fine pore diameter, a ratio of the inner peripheral side fine pore diameter to the outer peripheral side fine pore diameter, a water permeation amount (FW) at an inter-membrane differential pressure of 01 MPa, FD, F10, a pure water permeability coefficient K, a gradient when a change of the pure water permeability coefficient K was plotted in relation to a membrane thickness change, a fractionation particle diameter, a tensile strength and a tensile elongation of this obtained hollow fiber membrane were measured by methods similar to those of Example 1 and shown in Table 1. It was found that this obtained hollow fiber membrane was excellent in both permeation performance and fractionation characteristic and also in strength as in Example 1.

Example 5

The hollow fiber membrane before crosslinking in Example 1 was washed to remove polyvinylpyrrolidone contained in the membrane until a content of polyvinylpyrrolidone contained in the membrane became lower than 0.1 mass %. This hollow fiber membrane having polyvinylpyrrolidone removed therefrom was completely dried. Thereafter, this dried hollow fiber membrane was wetted by being immersed in an aqueous solution containing 50 mass % of ethanol. Then, this wetted follow fiber membrane was immersed in pure water for 24 hours. By doing so, water was contained in the entire hollow fiber membrane. The hollow fiber membrane in this state was immersed in an aqueous solution containing 1 mass % of polyvinylpyrrolidone (Sokalan K-90P produced by BASF Japan, D-value: 90). This hollow fiber membrane immersed in polyvinylpyrrolidone was crosslinked by a method similar to that of Example 1 to obtain a hollow fiber membrane containing a crosslinked body of polyvinylpyrrolidone. An outer peripheral side fine pore diameter, an inner peripheral side fine pore diameter, a ratio of the inner peripheral side fine pore diameter to the outer peripheral side fine pore diameter, a water permeation amount (FW) at an inter-membrane differential pressure of 01 MPa, FD, F10, a pure water permeability coefficient K, a gradient when a change of the pure water permeability coefficient K was plotted in relation to a membrane thickness change, a fractionation particle diameter, a tensile strength and a tensile elongation of this obtained hollow fiber membrane were measured by methods similar those of Example 1 and shown in Table 1.

Comparative Example 1

A hollow fiber membrane was obtained as in Example 1 except that polyvinylpyrrolidone in the hollow fiber membrane was washed as much as possible and a crosslinking and insolubilizing treatment was not applied to polyvinylpyrrolidone.

The obtained hollow fiber membrane was not hydrophilized, permeation resistance was increased and sufficient permeation performance was not obtained. A content of a crosslinked body of polyvinylpyrrolidone of the obtained hollow fiber membrane was 0 mass % since the crosslinking and insolubilizing treatment was not applied. Further, a content of polyvinylpyrrolidone of the obtained hollow fiber membrane was lower than 0.1 mass %.

Note that the hydrophilicity of the hollow fiber membrane obtained in this Comparative Example 1 was evaluated by a method similar to that of Example 1. That result is shown in FIG. 10.

Further, it is found from FIG. 10 that the hollow fiber membrane according to Example 1 containing polyvinylpyrrolidone in the membrane and having the crosslinking and insolubilizing treatment applied thereto has a smaller protein adsorption amount than Comparative Example 1 having the crosslinking and insolubilizing treatment not applied thereto. From this, it is found that the hollow fiber membrane according to Example 1 is hydrophilized by containing the crosslinked body of the polyvinylpyrrolidone-based resin.

Comparative Example 2

A hollow fiber membrane was obtained as in Example 1 except that polyvinyl alcohol (PVA-205 produced by Kuraray Co., Ltd.) was used and a sulfuric acid solution containing 1% of glutaraldehyde was used as a crosslinking solution during the crosslinking and insolubilizing treatment. A content of a crosslinked body of polyvinyl alcohol of the obtained hollow fiber membrane was 3.0 mass %. Note that this content was calculated by dissolving the obtained hollow fiber membrane in N-methylpyrrolidone, which is a good solvent for the vinylidene fluoride-based resin, and measuring the weight of the remaining crosslinked material. The obtained hollow fiber membrane could not obtain sufficient permeation performance.

Conditions, the pure water permeability coefficient and the like in each of the above Examples and Comparative Examples are shown in Table 2 below. Resins in Table are resins to be contained together with the vinylidene fluoride-based resin, wherein "PVP" is polyvinylpyrrolidone and "PVA" is polyvinyl alcohol. Note that the content of the crosslinked body in Comparative Example 2 indicates a content of the crosslinked body of PVA and the contents of the other crosslinked bodies indicate contents of the crosslinked bodies of PVP.

TABLE 2

|  | Examples | | | | | Comp. Examples | |
| --- | --- | --- | --- | --- | --- | --- | --- |
|  | 1 | 2 | 3 | 4 | 5 | 1 | 2 |
| Resin | PVP | PVP | PVP | PVP | PVP | PVP | PVA |
| Crosslinking | ○ | ○ | ○ | ○ | ○ | x | ○ |
| K-value | 90 | 120 | 60 | 90 | 90 | 90 | — |
| Content of crosslinked body (mass %) | 1.9 | 4.9 | 0.6 | 9.2 | 1.6 | 0 | 3.0 |

TABLE 2-continued

|  | Examples | | | | | Comp. Examples | |
| --- | --- | --- | --- | --- | --- | --- | --- |
|  | 1 | 2 | 3 | 4 | 5 | 1 | 2 |
| OPS fine pore diameter (µm) | 0.13 | 0.18 | 0.10 | 0.13 | 0.13 | 0.13 | 0.05 |
| IPS fine pore diameter (µm) | 5 | 6 | 5 | 5 | 5 | 5 | 0.13 |
| OPS fine pore diameter/ IPS fine pore diameter | 38 | 33 | 50 | 38 | 38 | 38 | 2.6 |
| FD10 (L/m²/hr) | 4560 | 11600 | 3480 | 7250 | 480 | 0 | 67 |
| FD (L/m²/hr) | 4890 | 12800 | 3480 | 7200 | 4800 | 0 | 68 |
| FW (L/m²/hr) | 5000 | 14000 | 3500 | 7500 | 5000 | 200 | 80 |
| FD/FW (%) | 97.8 | 91.4 | 99.4 | 96.0 | 96.0 | 0 | 85.0 |
| FD10/FW (%) | 91.2 | 82.9 | 99.4 | 96.7 | 9.6 | 0 | 83.8 |
| Pure water permeation coefficient K (×10$^{-15}$ m²) | 4 | 8.91 | 2.05 | 6.43 | 4 | 0.3 | 0.1 |
| Gradient (×10$^{-11}$ m) | 2.29 | 1.37 | 3.92 | 1.82 | 2.29 | <0.1 | <0.1 |
| Fractionation particle diameter (µm) | 0.02 | 0.1 | 0.01 | 0.02 | 0.02 | <0.01 | <0.01 |
| Strength (N/mm²) | 5.2 | 3.5 | 5.9 | 4 | 7.8 | 4.7 | 6.5 |
| Elongation (%) | 180 | 100 | 70 | 120 | 65 | 150 | 60 |

* OPS: outer peripheral side, IPS: inner peripheral side

As can be understood from Table 2 and the above description, Examples 1 to 5 are excellent in permeation performance and fractionation characteristic and also in strength as compared to Comparative Examples 1 and 2. Further, elongation is found to be higher in the case of crosslinking polyvinylpyrrolidone kneaded into the hollow fiber membrane before crosslinking (Examples 1 to 4) than in the case of crosslinking polyvinylpyrrolidone after the hollow fiber membrane before crosslinking was immersed in the polyvinylpyrrolidone aqueous solution (Example 5).

This application is based on Japanese Patent Application 2014-63791 filed on Mar. 26, 2014 and the contents thereof are incorporated in this application.

To express the present invention, the present invention has been appropriately and sufficiently described through the embodiment. However, it should be recognized that those skilled in the art can easily modify and/or improve the embodiment described above. Therefore, it is construed that modifications or improvements made by those skilled in the art are included within the scope of the appended claims unless those modifications or improvements depart from the scope of the appended claims.

INDUSTRIAL APPLICABILITY

According to the present invention, a hollow fiber membrane excellent in both permeation performance and fractionation characteristic and also in strength and its production method are provided.

LIST OF REFERENCE SIGNS 21 hollow fiber forming nozzle
22, 23 flow passage
24, 25 circulating pipe
26 outer discharge port
27 inner discharge port
31 membrane filter device
32 membrane module
33 upper end part
34 lower end part
35 inlet port
36 outlet port
37 air vent port

The invention claimed is:

1. A porous hollow fiber membrane, comprising a vinylidene fluoride-based resin, wherein the hollow fiber membrane has a gradient structure in which a pore diameter of pores in the hollow fiber membrane gradually becomes smaller at least toward one of inner and outer peripheral surface sides;
    the hollow fiber membrane is hydrophilized by containing from 0.1 to 15 mass % of a crosslinked body of a polyvinylpyrrolidone-based resin; and
    a ratio (FD10/FW) of a water permeation speed (FD10) at an inter-membrane differential pressure of 0.1 MPa in the dry state after wet and dry states are alternately repeated ten times to a water permeation speed (FW) at an inter-membrane differential pressure of 0.1 MPa in the wet state is 40% or higher;
    wherein a K-value of the polyvinylpyrrolidone-based resin is from 60 to 120.

2. The hollow fiber membrane according to claim 1, wherein:
    a water permeation amount at an inter-membrane differential pressure of 0.1 MPa is 1000 to 40000 L/m²/hr; and
    a fractionation particle diameter is 0.001 to 0.5 µm.

3. The hollow fiber membrane according to claim 1, wherein the hollow fiber membrane comprises a single layer.

4. The hollow fiber membrane according to claim 1, wherein the crosslinked body is obtained by crosslinking the polyvinylpyrrolidone-based resin contained in the hollow fiber membrane before crosslinking in forming the hollow fiber membrane before crosslinking.

5. A method for producing the hollow fiber membrane according to claim 1, the method comprising:
    extruding a membrane forming solution comprising the vinylidene fluoride-based resin, the polyvinyl-pyrrolidone-based resin, and a solvent into a hollow fiber;
    solidifying the membrane forming solution extruded into the hollow fiber and forming a hollow fiber membrane before crosslinking;
    washing the hollow fiber membrane before crosslinking; and
    crosslinking the polyvinylpyrrolidone-based resin in the hollow fiber membrane before crosslinking,
    wherein a mass ratio of the vinylidene fluoride-based resin to the polyvinylpyrrolidone-based resin is from 1.54 to 4.38.

6. The method according to claim 5, wherein said crosslinking comprises immersing the hollow fiber membrane before crosslinking in an aqueous solution comprising a radical initiator.

7. The hollow fiber membrane according to claim 1, wherein a pure water permeability coefficient is from $0.4 \times 10^{-11} \times L$ (m$^2$) to $6 \times 10^{-11} \times L$ (m$^2$) when a thickness of the hollow fiber membrane is L (m).

* * * * *